(12) United States Patent
Wheeler et al.

(10) Patent No.: US 8,396,284 B2
(45) Date of Patent: Mar. 12, 2013

(54) SMART PICKING IN 3D POINT CLOUDS

(75) Inventors: Mark Damon Wheeler, Monte Sereno, CA (US); Zhiyun Li, Kenmore, WA (US); Ramakrishnan Kazhiyur-Mannar, Castro Valley, CA (US); William Edward Wallace, Pleasanton, CA (US)

(73) Assignee: Leica Geosystems AG, Heerbrugg (CH)

( * ) Notice: Subject to any disclaimer, the term of this patent is extended or adjusted under 35 U.S.C. 154(b) by 1149 days.

(21) Appl. No.: 12/256,399

(22) Filed: Oct. 22, 2008

(65) Prior Publication Data

US 2009/0103773 A1   Apr. 23, 2009

Related U.S. Application Data

(60) Provisional application No. 60/982,016, filed on Oct. 23, 2007.

(51) Int. Cl.
 *G06K 9/00* (2006.01)
(52) U.S. Cl. ...................................... 382/154
(58) Field of Classification Search ............ None
 See application file for complete search history.

(56) References Cited

U.S. PATENT DOCUMENTS

| | | | | |
|---|---|---|---|---|
| 5,988,862 A * | 11/1999 | Kacyra et al. | ..................... | 703/6 |
| 6,804,380 B1 * | 10/2004 | Ioannou et al. | ............... | 382/103 |
| 6,922,234 B2 * | 7/2005 | Hoffman et al. | ........... | 356/141.1 |
| 7,505,037 B2 * | 3/2009 | Wang | ............................. | 345/424 |
| 7,728,833 B2 * | 6/2010 | Verma et al. | ................... | 345/420 |
| 8,077,913 B2 * | 12/2011 | Euler | ............................. | 382/103 |
| 2003/0202089 A1 * | 10/2003 | Alhadef et al. | ................ | 348/42 |

* cited by examiner

*Primary Examiner* — Vikkram Bali
(74) *Attorney, Agent, or Firm* — Maschoff Gilmore & Israelsen

(57) ABSTRACT

An embodiment of the invention includes a method for identifying a point representing a feature in a 3D dataset. The method includes performing a pick, which includes filtering the dataset to extract a subset of points based on certain criteria including a seed point and evaluating a metric for each point in the subset of points. The metric is a non-normalized probability that the point being evaluated represents the feature. The point or points with the highest metric is identified as representing the feature. Another embodiment of the invention includes a computer-readable medium comprising computer-executable instructions for identifying a point representing a feature in a 3D dataset. Another embodiment of the invention includes a method for displaying a view of a feature in a 3D dataset.

34 Claims, 17 Drawing Sheets

SMART PICKING IN 3D POINT CLOUDS

CROSS-REFERENCE TO RELATED APPLICATIONS

This application claims the benefit of, and priority to, U.S. Provisional Patent Application Ser. No. 60/982,016 filed on Oct. 23, 2007, the contents of which are incorporated herein by reference in its entirety.

BACKGROUND OF THE INVENTION

Laser distance-measuring systems measure space to such a high degree of measurement density that the resultant mass of points (often called a point cloud) can appear as a coherent scene in the manner of a pointillist painting. These systems produce sets of echoes, or point clouds, which are data sets representing points whose position, distance and other characteristics are sensed by the system.

Typically, the systems collect data in such a way as to transform raw sensor data into point data that have three position coordinates, x, y and z. The raw sensor data is expressed in spherical coordinates: an angle $\theta$ that represents the angle of rotation about a vertical axis, an angle $\phi$ that represents the angle of rotation about a horizontal axis and a range or distance $\rho$. The angle coordinates correspond with the movable laser-scanner or LIDAR components that determine the direction of an emitted laser pulse. These spherical coordinates are often transformed into Cartesian coordinates, which are more convenient for later operations on the data.

FIG. 1 illustrates a block diagram of an example scanning system from the prior art used to create a 3D dataset. A Field Digital Vision (FDV) module 105 includes a scanning sensor for scanning an object 100 and for sensing the position in three-dimensional space of selected points on the surface of the object 100. The FDV module 105 generates a point cloud 110 which represents the sensed positions of the selected points. The point cloud 110 can also represent other attributes of the sensed positions, such as reflectivity, surface color and texture.

A Computer Graphics Perception (CGP) module 115 interacts with the FDV 105 to provide control and targeting functions for the FDV module 105 sensor. In addition, using the point cloud, the CGP module 115 can recognize geometric shapes represented by groups of points in the point cloud 110, and the CGP module 115 can generate a CGP model 120 that represents these geometric shapes. From the CGP model 120, the CGP module 115 can generate a further model usable by computer-aided design (CAD) tools 125.

FIG. 2 illustrates the prior art FDV 105 from FIG. 1 including a scanning laser system (LIDAR) 210 that scans points of the object 100 and that generates a data signal that precisely represents the position in three-dimensional space of each scanned point. The location can be given as a set of coordinates. The coordinates can be identified in Cartesian coordinates, spherical coordinates, cylindrical coordinates or any other coordinate system. Each coordinate system has a set of defined axes, e.g. if the dataset uses Cartesian coordinates, a set of x, y and z axes are also defined. Often conversion between coordinate systems is a straightforward operation using well known conversion equations. The LIDAR data signal for groups of scanned points collectively constitutes the point cloud 110. In addition, a video system 215, preferably including both wide angle and narrow angle charge coupled device (CCD) cameras, is provided. The wide angle CCD camera of the video system 215 acquires a video image of the object 100 and provides, to the CGP 115 via a control/interface module 220 of the FDV 105, a signal that represents the acquired video image.

In response to user input relative to the signal that represents the acquired video image, the CGP 115 provides a scanning control signal to the LIDAR 210, via the control/interface module 220, for controlling which points on the surface of the object 100 the LIDAR 210 scans. More particularly, the scanning control signal provided from the CGP 115 controls an accurate and repeatable beam steering mechanism to steer a laser beam of the LIDAR 210.

In addition, the narrow angle CCD camera of the video system 215 captures the intensity of the laser return from each laser impingement point, along with texture and color information, and provides this captured information to the CGP 115. Other properties can also be measured or calculated for points or groups of points, such as a normal vector for a point or group of points, or the points can be fit to particular geometric shapes, such as lines, planes, spheres, cylinders or any other geometric shape.

The CGP 115 is constituted of a data processing system (e.g., a notebook computer or a graphics workstation) and special purpose software that when executed configures the CGP 115 data processing system to perform the FDV 105 control and targeting functions, and also to perform the CGP model generation functions.

The CGP 115 controls the scanning LIDAR 210 of the FDV 105 by providing a LIDAR control signal to the FDV 105 that controls which points of the object 100 the FDV 105 scans. User input is provided to the CGP 115 which defines what portions of the object 100 to scan, and at what resolution.

Each data point in the point cloud 110 generated by the FDV represents both distance to a corresponding laser impingement point from an FDV 105 "origin point" and the angle from the origin point to the laser impingement point. The CGP software configures the CGP 115 computer to process the data points of the point cloud 110, generated by the LIDAR 210 as a result of scanning the object 100, to display and visualize the scanned portions of the object 100. More specifically, the CGP software can configure the CGP 115 computer to recognize geometric shapes in the object 100 ("graphic perception") and, using these recognized geometric shapes, to perform geometry construction, 3D model construction, 3D visualization, and database functions for automated acquisition or manual input of object attributes, generation of plans, sections, and dimensions, data query, and CAD interfaces, and networking options.

FIG. 3 illustrates an example of a physical arrangement of the prior art FDV 300 of FIGS. 1 and 2. The FDV 300 can be mounted on a tripod 305 or other mounting device. A notebook computer 310 can contain the CGP and can be in communication with the FDV 300 via a data cable 315 or in some other manner.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is this summary intended to be used as an aid in determining the scope of the claimed subject matter.

An embodiment of the invention includes a method for identifying a point representing a feature in a 3D dataset. The method includes performing a pick, which includes filtering the dataset to extract a subset of points based on certain criteria, which can include a seed point, and evaluating a metric for each point in the subset of points. The metric is a non-normalized probability that the point being evaluated represents the feature. The point or points with the highest metric is identified as representing the feature.

Another embodiment of the invention includes a computer-readable medium comprising computer-executable instructions for identifying a point representing a feature in a 3D dataset. The method includes performing a pick, which includes filtering the dataset to extract a subset of points based on certain criteria, which can include a seed point, and evaluating a metric for each point in the subset of points. The metric is a non-normalized probability that the point being evaluated represents the feature. The point or points with the highest metric is identified as representing the feature.

Another embodiment of the invention includes a method for displaying a custom view of a feature in a 3D dataset. The method includes defining the feature to be detected, picking a point representing the feature, determining a custom view direction based on the feature and displaying a slice of data along the custom view direction in the immediate neighborhood of the picked point.

These and other objects and features of the present invention will become more fully apparent from the following description and appended claims, or can be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Once scan data, a point cloud especially, is collected, a user typically views and manipulates the point cloud to gather information from the point cloud. For example, a user may wish to measure the distance between a road surface shown in the point cloud and a bottom surface of a bridge as depicted in the point cloud. However, when manipulating 3D visualized data it is often desirable to select a specific surface even though the surface can be obstructed from view by one or more other surfaces not related to the desired surface. With 3D point cloud data, it is common to have several layers of data points overlapping the measured surface in any given view e.g. in a top-down view, leaves of a tree can obstruct the ground below multiple times.

Alternatively, a user may wish to identify particular features within a point cloud. Such features can be known or unknown by the user, can be identified beforehand or a user can have video and/or pictures of the scanned object(s) to help identify features. Marking features in large 3D datasets is a frequent task performed by users such as surveyors. Often, the features marked are small, compared to the entire span of the dataset. Moreover, zooming in on the location might not always be possible, or preferable, because at high zoom levels, context can be lost. Manipulating point clouds manually can be a tedious, time consuming process. Therefore, an improved method for detecting certain features and presenting a view to a user for verification or further use would be highly beneficial.

Embodiments of the present invention relate to picking points in a 3D dataset in the possible presence of other unrelated surfaces occluding the point from the viewer. A pick point represents a geometric, topological or other such feature in the data. That is, the pick point represents the point most likely appearing in or on the desired feature in the dataset.

Figure 1:
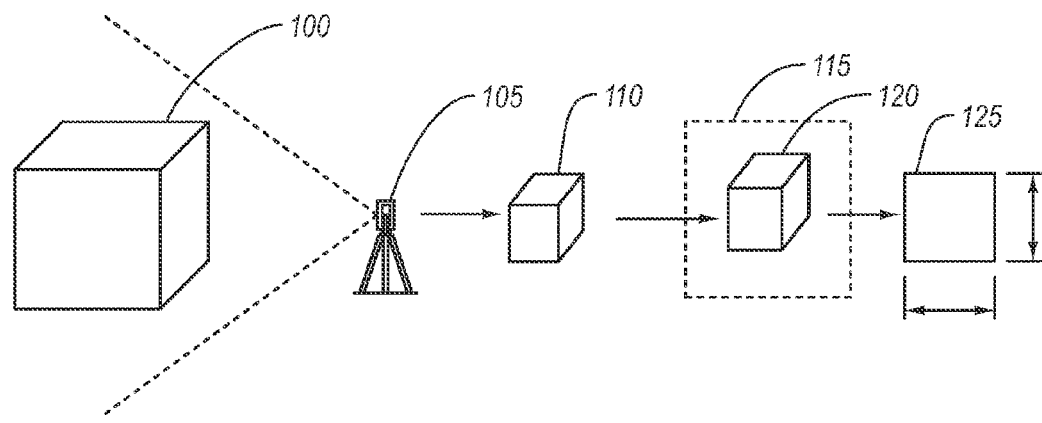
FIG. 1 illustrates a block diagram of an example scanning system from the prior art used to create a 3D dataset.
Figure 2:
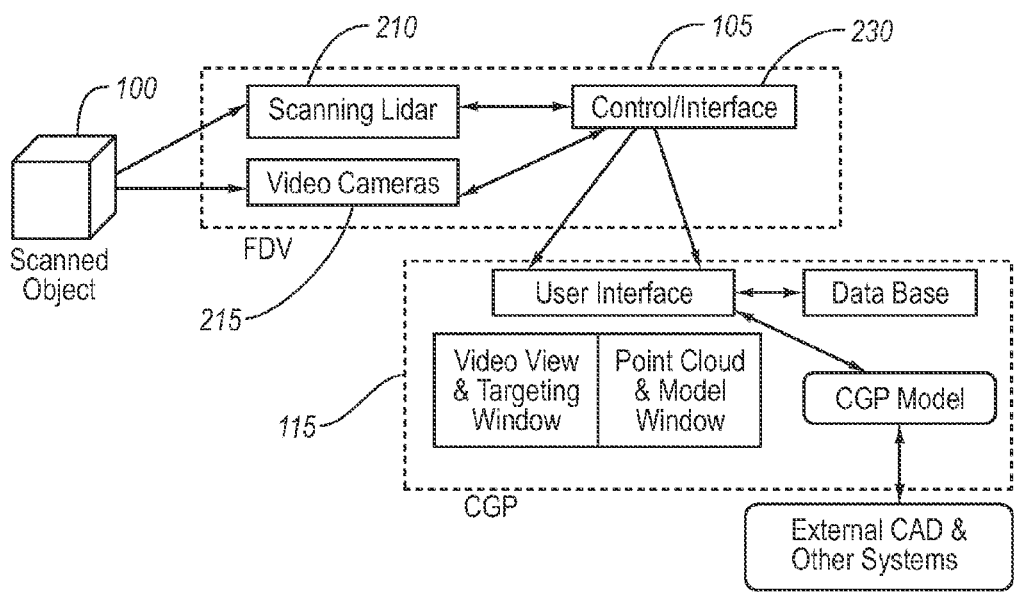
FIG. 2 illustrates the Field Digital Vision (FDV) module of FIG. 1.
Figure 3:
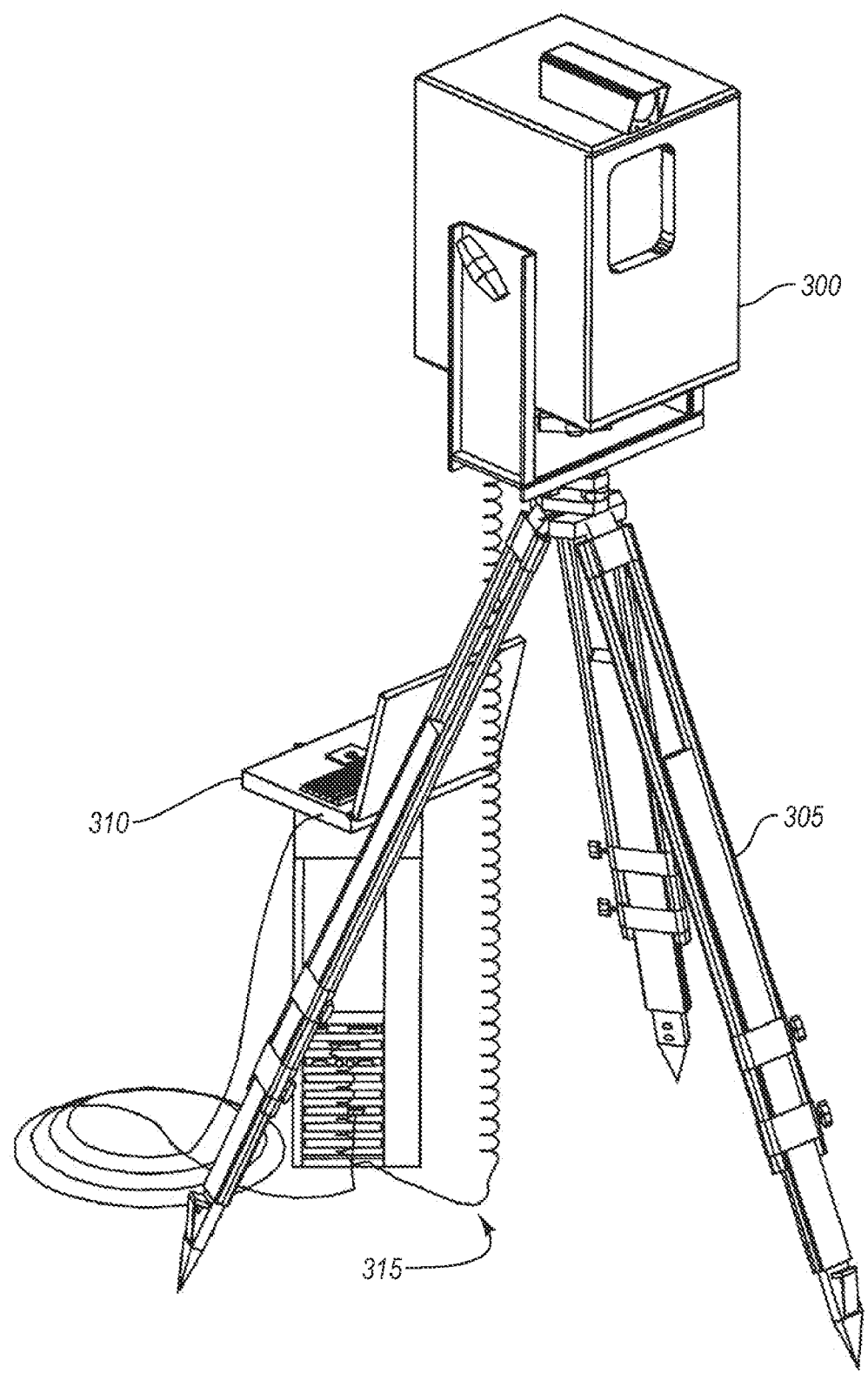
FIG. 3 illustrates the physical arrangement of the FDV module of FIGS. 1 and 2.
Figure 4:
FIG. 4 illustrates an example of a 3D dataset in which the view of a feature is blocked from the view point by intervening data points.

FIG. 4 illustrates an example of a 3D dataset 400 in which the view of a desired feature 410 is blocked from the view point 405 by intervening data points. The 3D dataset 400 can include a set of points, referred to as a point cloud. It is not always possible for a user to place a marker representing a feature in 3D visualization data without first manipulating the view or otherwise maneuvering within the data. Likewise, it is not always possible for the user to get a clear view of the desired portion of the point cloud either for picking the appropriate point or for verifying that the correct point has been picked. This may be prevented either due to the shape of the neighborhood, or awkward positioning of the point. For example, the feature can be close to another feature, sandwiched between other features, occluded partially, or completely, by another feature, be small in size compared to other features, or otherwise obscured. Additionally, the view direction can be such that it is difficult, if not impossible, for features to be distinguished from features that are nearer or farther or that neighboring features are difficult, or impossible, to distinguish from one another. A solution described below includes a method for picking the desired point, even when the point is so obstructed from the user's view. Once the point has been picked a custom view can be defined for the feature to allow a user to better identify the feature or otherwise manipulate the points.

Figure 5:
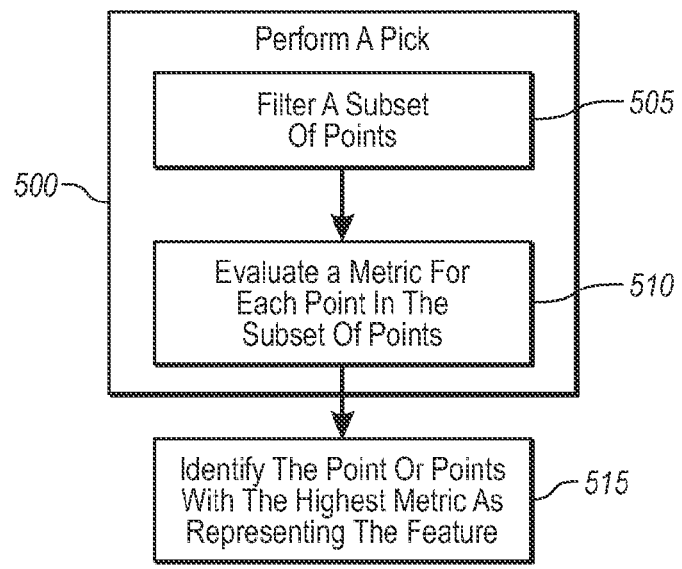
FIG. 5 is a flow diagram illustrating a method for identifying a point in a 3D dataset that can be used to represent a feature.

FIG. 5 illustrates an example of a method for identifying a point in a 3D dataset that can be used to represent a feature. First a pick is performed 500, which includes a series of filtering 505 and evaluation 510 operations. Each feature detection algorithm can thus define a type of pick 500 to be performed, which can in turn determine additional picks to be performed to provide a starting point for the current pick 500. Each pick 500 is defined irrespective of all other picks that can use the pick downstream. An example uses a computer readable medium comprising computer-executable instructions for performing the pick 500 and identifying the point representing the feature 515. In another example, the computer-readable medium stores computer-executable instructions for providing a custom view of the picked point for identification and/or further manipulation. The computer-readable medium can also store the necessary computer-executable instructions for performing some or all of the picks needed to obtain a seed point to use as a starting point for the pick 500.

Filtering a subset of points 505 can include selecting a subset of points which contains some or all of the original dataset. Filtering a subset of points 505 is usually, but does not always need to be, based on a seed point. A seed point is defined as a point selected by a user, selected automatically, or selected in some other manner, which acts as a point or location against which other points are considered. An example uses user input of only a related, but not necessarily proximate, point. Other examples use previous picks as a starting point. Other methods of filtering a subset of points 505 can obviate the need for a seed point, such as taking a portion of the points with particular qualities, such as color or intensity, or selecting points within a certain set of coordinates. In some examples, using a seed point or other methods of filtering obviates the need for culling the occluding surfaces, a time consuming procedure for the end user.

The filter operation 505 involves extraction of a subset of points based on certain criteria and on the properties of the scanned points. These criteria can include geometric location, color, intensity, or the normal angle of the point, which is the angle between the normal of the point and the view direction. Geometric or spatial filters are easy to visualize and explain. Hence, language suggestive of such filters is used in the following examples. However, these filters need not necessarily be spatial. The shape of the filter can be defined by the pick being performed, e.g. a highest pick can use an infinite vertical cylinder to determine the highest point in a column.

Filtering a subset of points 505 can be done using a filter of any shape, including conical or cylindrical filters. An example of a conical filter is one in which a camera point, or the point from which the dataset is being viewed, acts as the apex of the cone. In an example, the axis of the cone is the line through the apex, or camera point, and through a seed point selected by a user, or by another other method. In another example, the radius of the cone about the seed point can be any convenient value, can be selected automatically, can be set by the user, or can be set in some other way. In other examples a set number of points can be desired and the radius, length, or both, of the conical filter can be adjusted to include the proper number of points. In an example, the cone can extend through the entire dataset, that is, the cone has no defined base within the dataset, but can theoretically extend to infinity. In other examples, the cone can have a defined base or extend only into a portion of the dataset. The base of the cone can be orthogonal to the axis or can form an arbitrary angle with the axis. The base of the cone can be circular, elliptical or any other regular or irregular shape. In an example, the conical filter selects the points within the volume of the cone as a subset of points. In other examples, the cone can select the points lying on the surface of the cone or select the points lying outside the volume of the cone as the subset of points.

An example of a cylindrical filter is a cylinder that extends through the entire dataset, that is, the cylinder has no defined ends within the dataset, but can theoretically extend to infinity. In other examples, the cylinder can have one or both ends defined within the dataset. In an example, the axis of the cylinder is the line through the seed point and is substantially parallel to the z-axis. In other examples the axis of the cylinder can be parallel to either the x-axis or y-axis, or can be set at an arbitrary angle to one or more of the axes. In an example, the radius of the cylinder can be any convenient value, can be selected automatically, can be set by the user or can be set in some other way. In other examples a set number of points can be desired and the radius, length, or both, of the cylindrical filter can be adjusted to include the proper number of points. The base of the cylinder can be orthogonal to the axis, or can form an arbitrary angle with the axis. The base(s) of the cylinder can be circular, elliptical or any other regular or irregular shape. In an example, the cylindrical filter can select the points within the volume of the cylinder as a subset of points. In other examples, the points lying on the surface of the cylinder can be selected, or the points lying outside the volume of the cylinder can be selected.

Each pick type can also evaluate a metric for each point in the subset of points 510. A metric is a standard unit of measure, or more generally, part of a system of parameters, or systems of measurement, or a set of ways of quantitatively and periodically measuring, assessing, controlling or selecting a person, process, event, or institution. In an example, this metric for each point in the subset of points 510 is a non-normalized probability that the point represents the feature the pick is designed to search for. Probability is the likelihood or chance that something is the case. A non-normalized probability is a probability which is unbounded. That is, a non-normalized probability does not have a direct correlation to how likely the point represents the feature. The only information that can be inferred using non-normalized probability is that a point with a higher metric means that the point is more likely to represent the feature than a point with a lower metric. How likely, or how much more likely, cannot necessarily be inferred. For example a point with a non-normalized probability of 0.5 cannot be interpreted as a 50% chance that the point represents the feature as would be the case with a normalized probability. Likewise a non-normalized probability of 0.5 does not necessarily mean that the point is twice as likely to represent the feature as a point with a non-normalized probability of 0.25.

In other examples the probability can be normalized. A normalized probability is a probability which is bounded, that is, the sum of all probabilities is equal to one. A normalized probability does have a direct correlation to how likely the chosen point represents the feature. Other information can be inferred from a normalized probability. For example a point with a normalized probability of 0.5 can be interpreted as a 50% chance that the point represents the feature. Likewise a normalized probability of 0.5 does mean that the point is twice as likely to represent the feature as a point with a normalized probability of 0.25.

In an example, it can be impossible to state with certainty that a certain point definitely represents (or does not represent) a feature. The metric, then, is used as a comparative, i.e. all that can be said for certain is that a point with a higher metric evaluation more likely represents the feature than one with a lower evaluation. Therefore, the method of FIG. 5 identifies the point or points with the highest metric as representing the feature 515. This point can be returned as the output of the pick, can be used by other picks or can be used in some other manner. Note that circular dependencies are not precluded, i.e. one pick can use another, which sometimes, directly or indirectly, uses the former again.

Figure 6:
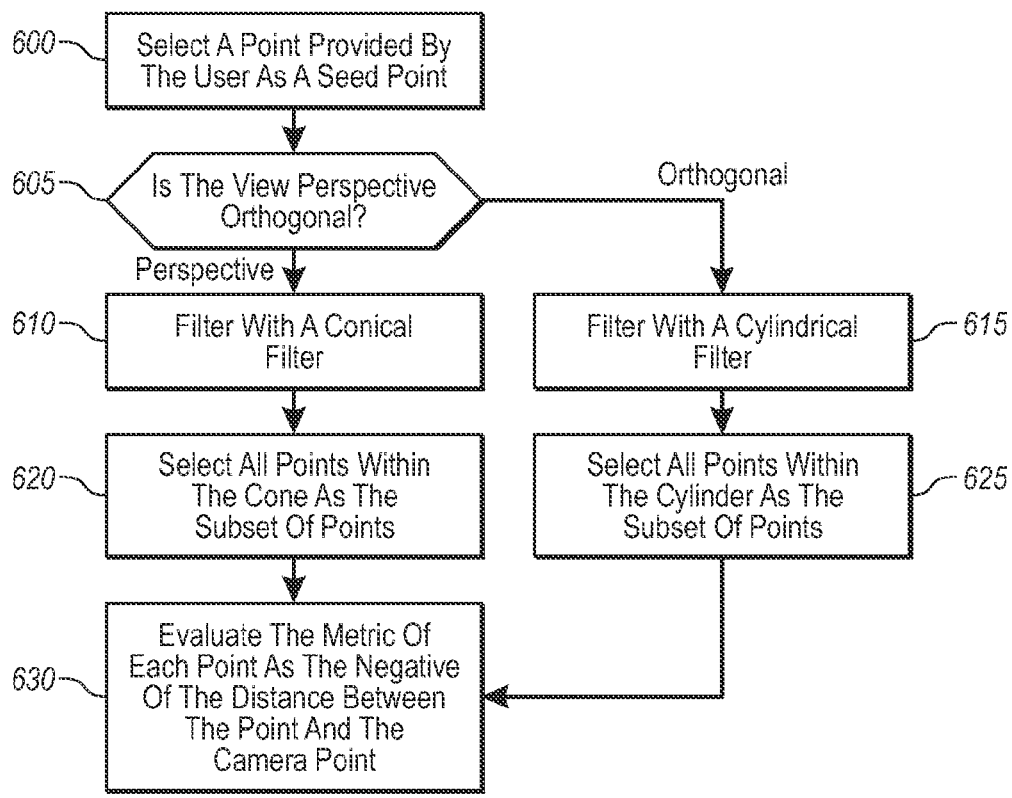
FIG. 6 is a flow diagram illustrating a method for performing a closest pick.

FIG. 6 illustrates an example of a method for performing a closest pick, that is, a pick that identifies the non-occluded point rendered at a given screen coordinate. A point provided by a user is selected as a seed point 600. The type of filter used depends on whether the view is perspective or orthogonal 605. Perspective is an approximate representation, on a flat surface, of an image as the image is perceived by the eye. A perspective view of a three-dimensional image portrays height, width, and depth. Two characteristic features of a perspective are that objects are drawn: (i) smaller as their distance from the observer increases; and (ii) foreshortened—the size of an object's dimensions along the line of sight are relatively shorter than dimensions across the line of sight. Perspective viewing can cause distortion which can make some objects and scenes incompressible. An orthogonal view or projection eliminates the effect of distance from a viewpoint, and therefore provides a useful means of locating points and objects in 3-D space. That is, points do not scale, or shrink, as distance to the point increases in an orthogonal view.

If a perspective view is used, the filter includes a conical filter 610, with the points within the filter selected as the subset of points 620. If the view is orthogonal, the filter includes a cylindrical filter 615 with the points within the cylinder selected as the subset of points 625. The metric for each point is the negative of the distance from the point to the camera or view point 630. Because the closest pick can be identified using a point identified by a user as a seed point 600, the closest pick can be a primary pick. The closest pick can be used as a starting point for other picks.

Figure 7:
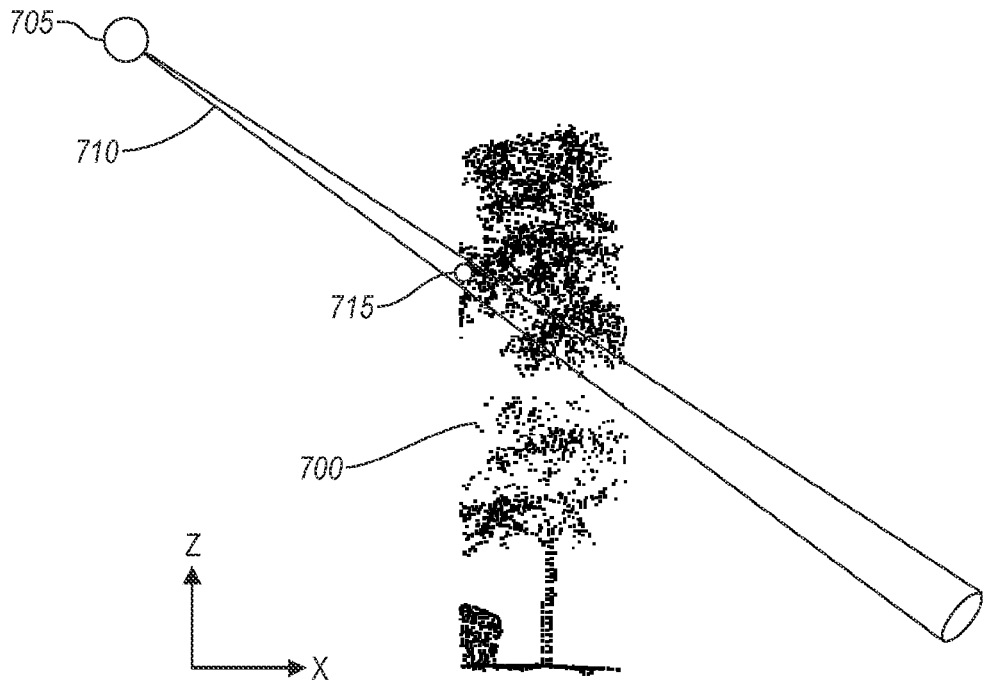
FIG. 7 illustrates an example of a closest pick.

FIG. 7 illustrates an example of a closest pick. In an example, a seed point (not shown) is selected by a user and a conical filter 710 with an apex at the camera point 705 is used to identify a subset of points. Within the subset, the point that is the smallest distance from the camera point is identified as the closest 715. The point identified is the point within the subset of points which is closest to the camera point 705 and is not necessarily, but can be, the closest point within the dataset 700.

Figure 8:
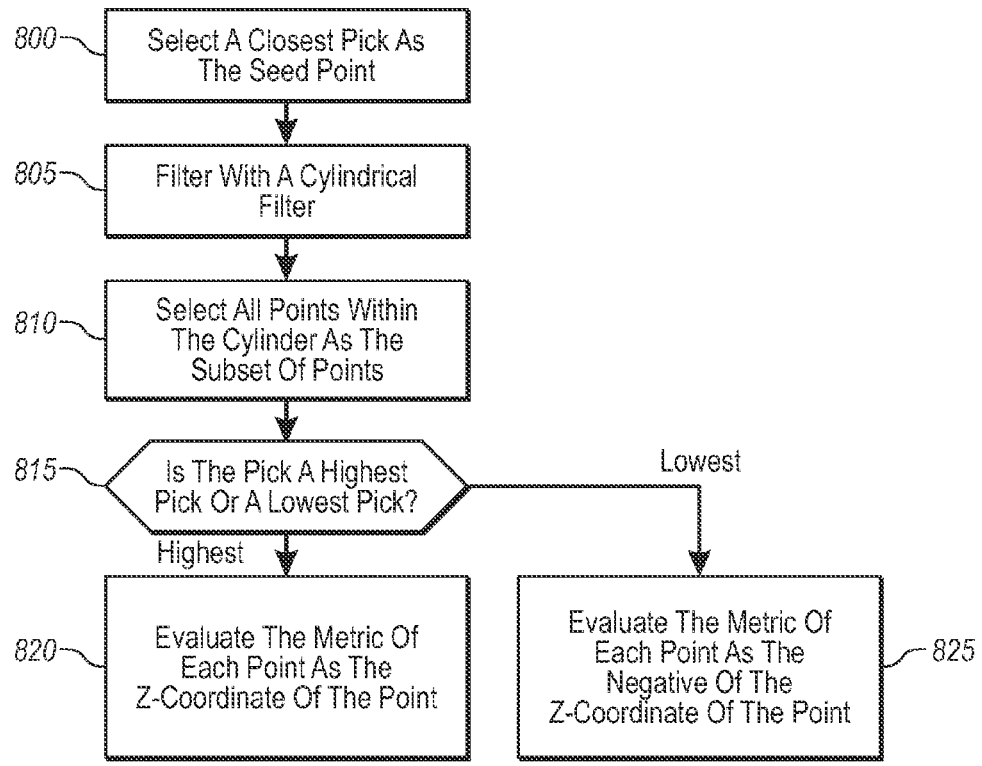
FIG. 8 is a flow diagram illustrating a method for performing a highest pick or a lowest pick.

FIG. 8 illustrates an example of a method for performing a highest pick or a lowest pick, which identifies the point that is vertically highest or lowest respectively in the vicinity of a seed pick either selected by a user or through some other method. The highest pick and lowest pick need not necessarily return the point which is highest or lowest within the dataset, but can return a point that is highest or lowest within a given region.

A closest pick is selected as a seed point 800. Because both the highest and lowest pick can use a closest pick as their seed point 800 the highest and lowest picks can be a secondary pick. From the seed point a cylindrical filter 805 is used which selects as a subset of points all of the points within the cylinder 810. The cylindrical filter 805 can have an axis through the seed point and be substantially parallel to the z-axis. The cylindrical filter can be bound to contain only points within a certain region or can extend through the entire dataset. For example, if a user wanted to identify the top of a wall, but a tree or some other structure overhung the wall, the user can perform a highest pick and bound the cylinder at a certain height to eliminate the points from the tree or overhanging structure. The evaluation operation performed depends on whether the pick is a highest or lowest pick 815. If the pick is a highest pick the metric is the z-coordinate of the point 820. If the pick is a lowest pick, the metric is the negative of the z-coordinate of the point 825.

Figure 9:
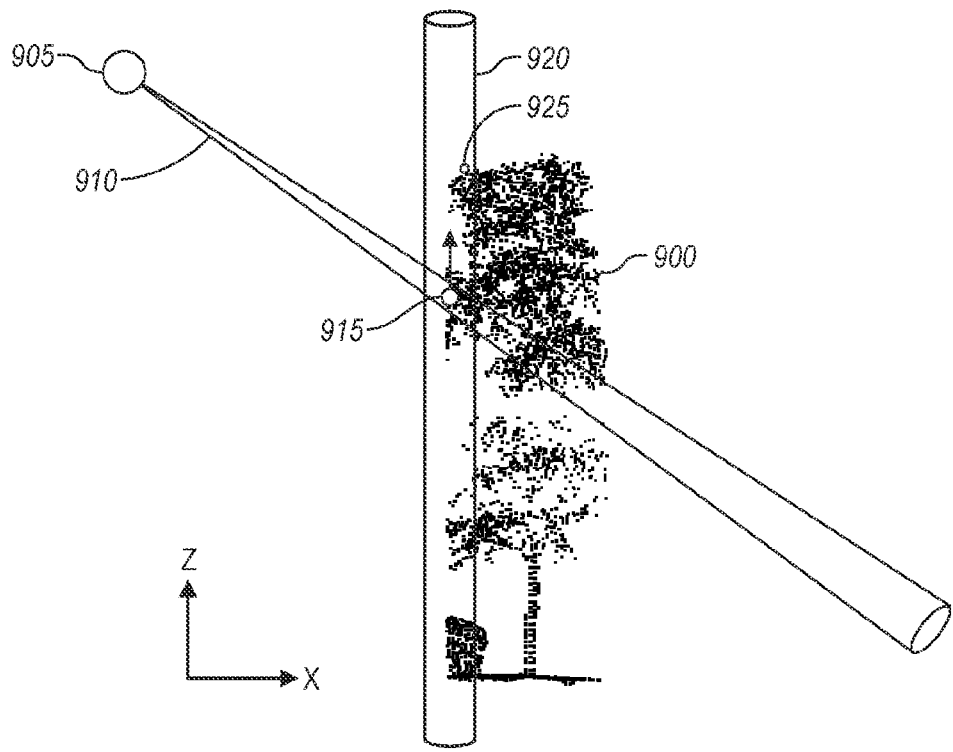
FIG. 9 illustrates an example of a highest pick.
Figure 10:
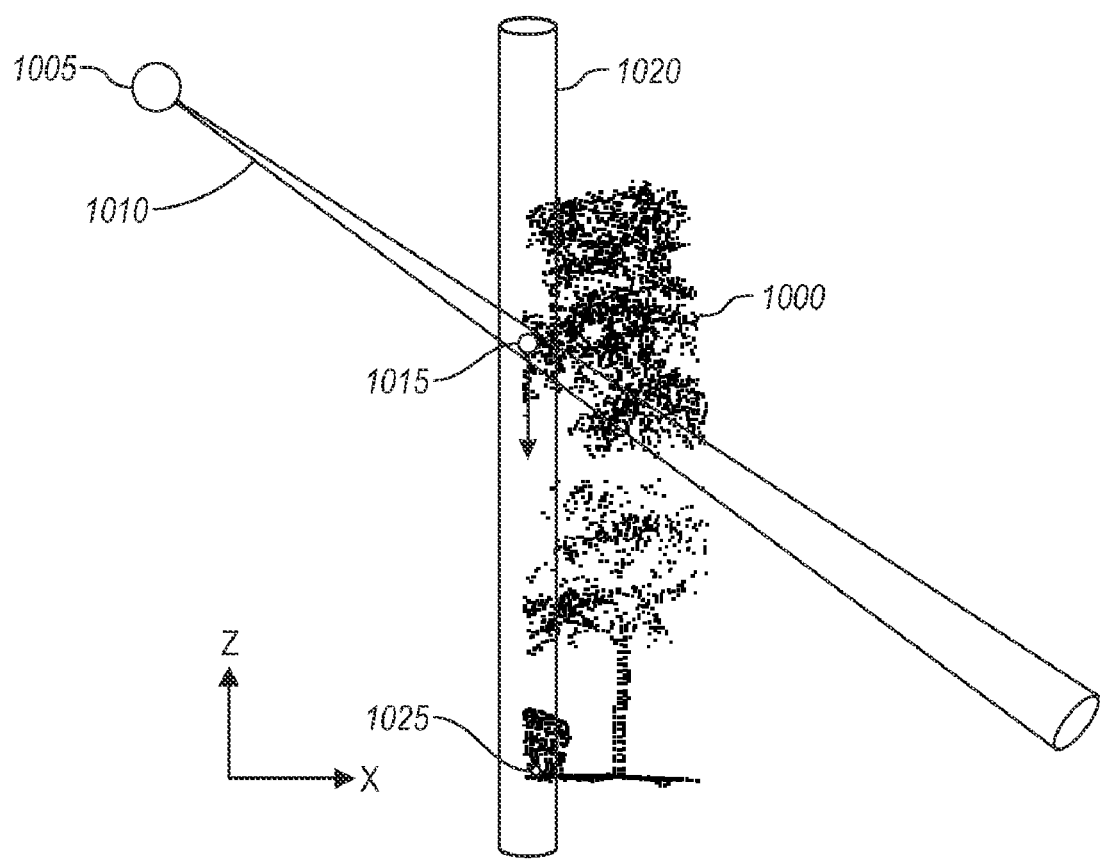
FIG. 10 illustrates an example of a lowest pick.

FIG. 9 illustrates an example of a highest pick. In an example, a seed point (not shown) can be selected from the points in the dataset 900 by a user, or through some other method. This point is used to perform a closest pick 915 using a conical filter 910, with the closest pick 915 used as the seed point for the highest pick. A cylindrical filter 920 using the closest pick 915 as a seed point is used to identify a subset of points which can be evaluated to determine which is the highest within the vertical cylinder. The cylindrical filter 920 of FIG. 9 is an unbounded cylinder, that is, the cylinder extends through the entire dataset 900. The point with the largest z-coordinate in the subset of points is identified as the highest pick FIG. 10 illustrates an example of a lowest pick. In an example, a seed point (not shown) can be selected from the points in the dataset 1000 by a user, or through some other method. This point is used to perform a closest pick 1015 using a conical filter 1010, with the closest pick 1015 used as the seed point for the lowest pick. A cylindrical filter 1020 using the closest pick 1015 as a seed point is then used to identify a subset of points which can be evaluated to determine which is the lowest within the vertical cylinder. The cylindrical filter 1020 of FIG. 10 is an unbounded cylinder, that is, the cylinder extends through the entire dataset 1000. The point with the lowest z-coordinate in the subset of points is identified as the lowest pick 1025. In an example the axes can be arbitrary, which will allow for negative z-coordinates. Because the negative of the z-coordinate is used, the point with the lowest z-coordinate will still have the highest metric and be returned by the lowest pick.

Figure 11:
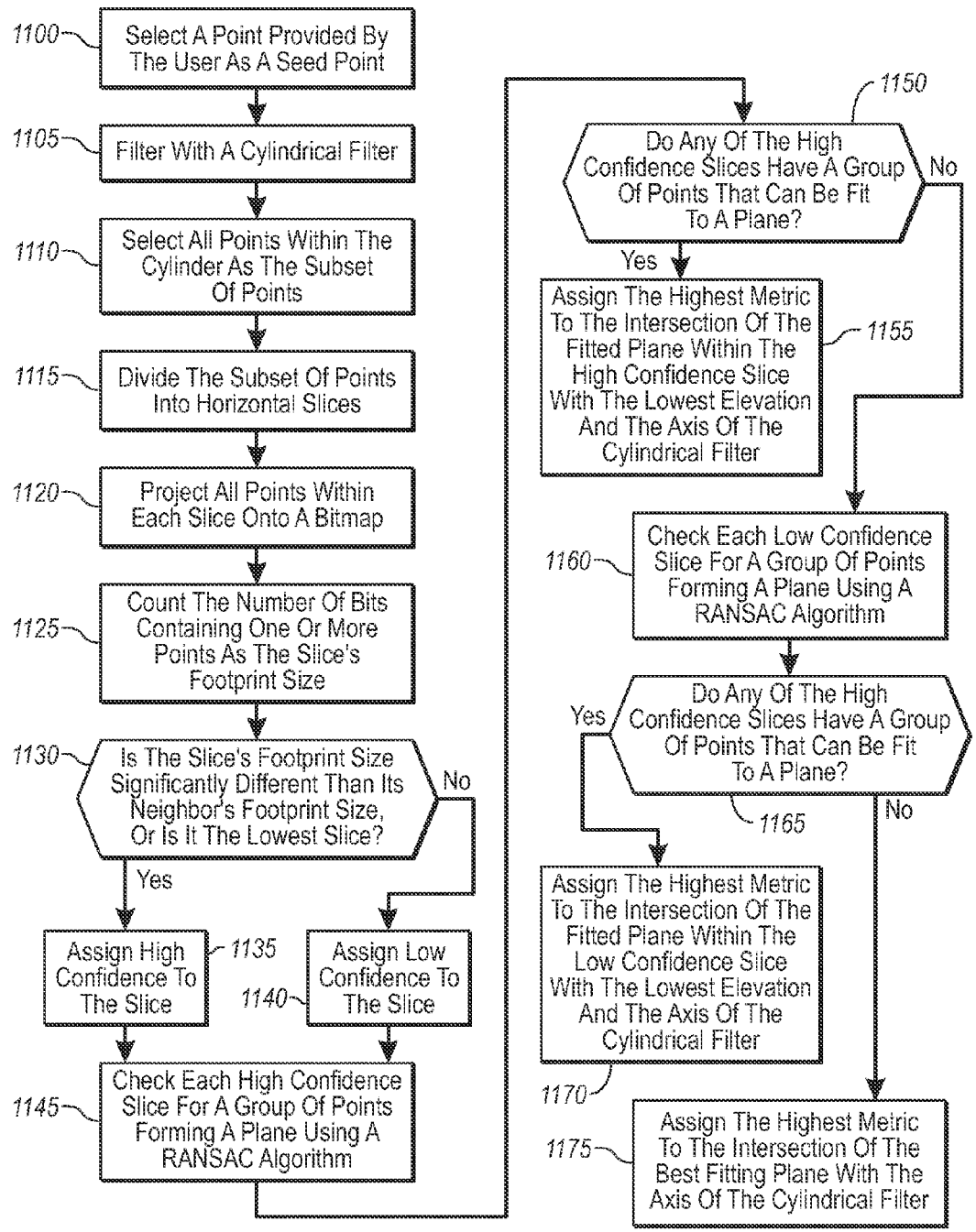
FIG. 11 is a flow diagram illustrating a method for performing a lowest planar surface pick.

FIG. 11 illustrates an example of a method which can be used to perform a lowest planar surface pick, which is used to identify a point on the lowest elevation plane. In some embodiments, a lowest planar surface pick can be a ground pick, which identifies a point on the ground, since the surface of the earth looks approximately planar at locations near the earth. In other embodiments, the lowest planar surface pick can be a floor, a table, a roof or any other planar surface with the lowest elevation in the data set. Lowest planar surface picks can be more complex than other picks because the characteristics of the local neighborhood of each point can be considered. There are several assumptions that can be made to help identify a lowest planar surface. First, the set can be assumed to be low in elevation, or even in many cases, the lowest elevation. The lowest point cannot always be taken as the lowest planar surface pick, since there can be points below the lowest planar surface (including the real ground surface) from various sources, such as noise from the scanner, drainage below the lowest planar surface or reflection from other surfaces. Second, the set can be assumed to look like a flat plane. Third, the points in this set can be assumed to distribute more evenly on the X-Y plane than neighboring sets.

A closest pick is performed to select a seed point 1100. From the seed point, a cylindrical filter 1105 with its axis through the seed point and substantially parallel to the z-axis is used. The cylindrical filter can be bound or can extend through the entire dataset. The points within the cylindrical filter are selected as the subset of points 1110. The subset of points is further divided into horizontal slices 1115. The horizontal slices contain points that have z-coordinates within a predetermined range. The thickness (i.e., extent in the z axis) of the slice can be determined automatically and roughly so that the depiction of the lowest planar surface will be included inside a slice. For example, if the lowest planar surface is perfectly leveled, the depth can be set to a small number merely to accommodate scanner deviation, but if the lowest planar surface has a slope, the depth can be larger to capture the surface. However, because this slice is only used to roughly isolate the lowest planar surface, in practice the depth can be insensitive and can be set as a value large enough to capture the lowest planar surface with sufficient slope tolerance. The slices can be adjacent to and share boundaries with neighboring slices, can overlap neighboring slices, or may not be adjacent to or overlap neighboring slices.

Figure 12:
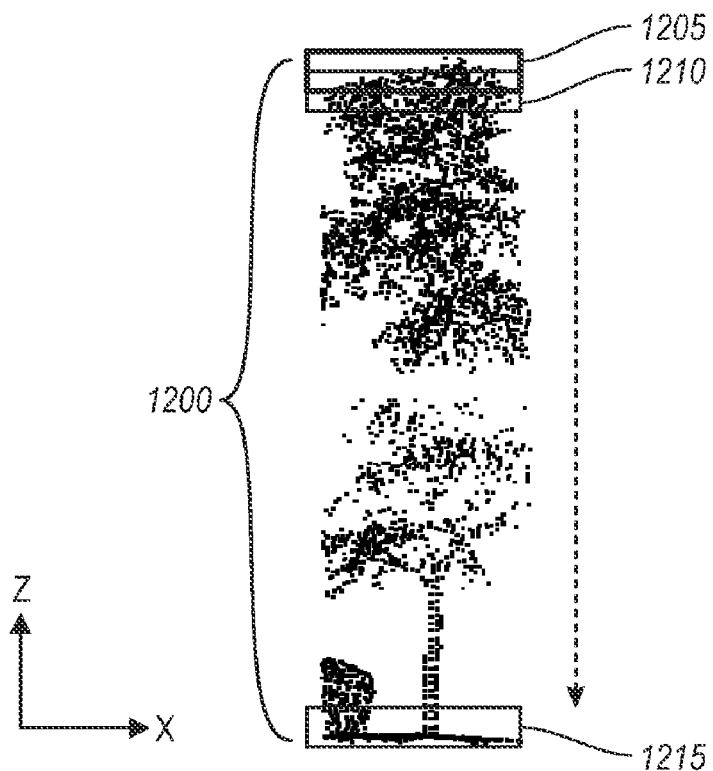
FIG. 12 illustrates a ground pick in which horizontal slices overlap.

FIG. 12 illustrates an example of a ground pick in which two horizontal slices overlap. The first slice 1205 contains the points near the top of the subset 1200. The second slice 1210 has been lowered from the first slice 1205 by an amount less than the thickness of the first slice 1205. This process continues until the bottom of the subset 1200 has been reached and the final slice 1215 is created.

Figure 13:
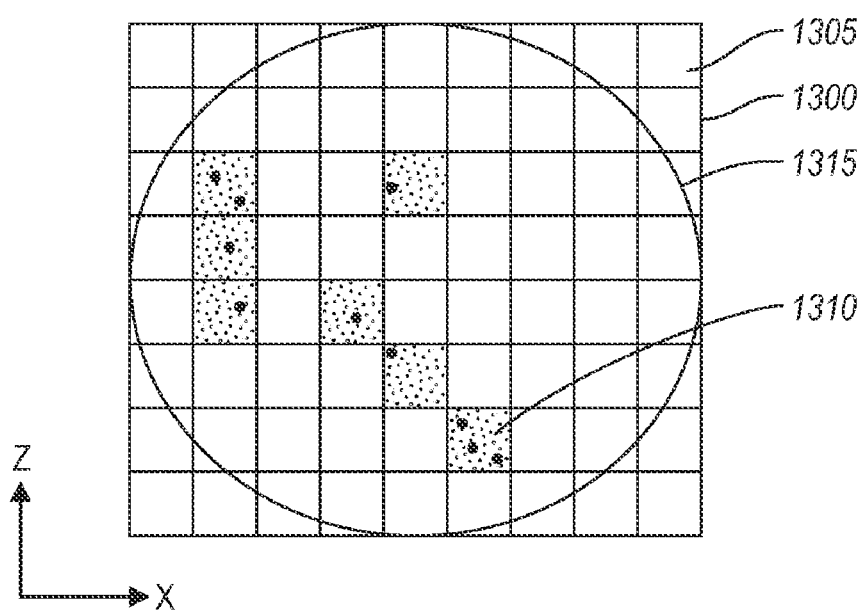
FIG. 13 illustrates a projection of points onto a bitmap used in a ground pick.

Returning to FIG. 11, all points within each slice are projected onto a bitmap 1120. The bitmap has a number of smaller squares or other polygons known as bits that can each contain one or more points. A bitmap is used because the bits are identified as containing points in a binary fashion, that is, the bits either contain one or more points, or they do not, with different values given for bits that contain points than those which do not. The number of bits containing one or more points are counted as the footprint size of the slice 1125. This is further illustrated in FIG. 13 in which a bitmap 1300 of arbitrary size has been created and divided into a number of bits 1305. An arbitrary slice has been projected onto the bitmap 1300. Some of the bits 1305 contain one or more points 1310 and some do not. The number of points projected onto the bitmap 1300 of FIG. 13 is ten. The footprint size is seven because two of the bits 1305 contain multiple points. The elliptical outline 1315 is provided as a reminder that the subset of points has been filtered through a cylindrical filter.

Returning to FIG. 11, the footprint size of each slice is calculated and checked to determine if it is significantly different than the footprint size of neighboring slices 1130. If the footprint size differs significantly from neighboring slices or is the lowest slice then the slice is assigned high confidence 1135. Whether a difference is significant or not can depend on the application, can depend on the dataset, or can be set by the user. The amount of difference considered significant can be changed for different datasets or for different picks within the same dataset. If the footprint size does not differ significantly from neighboring slices or if the slice is not the lowest slice, then the slice is assigned low confidence 1140.

Each high confidence slice is checked for a group of points forming a plane using a RANSAC algorithm 1145. RANSAC is an iterative method used to estimate parameters from a set of observed data which can contain outliers. A RANSAC algorithm is also a non-deterministic algorithm in that it produces a reasonable result only with a certain probability, the more iterations which are allowed the higher is this probability. A basic assumption is that the data consists of "inliers", i.e., data whose distribution can be explained by some set of model parameters, and "outliers" which are data that do not fit the model. In addition to this, the data can be subject to noise. The outliers can come, e.g., from extreme values of the noise or from erroneous measurements or incorrect hypotheses about the interpretation of data.

The basic RANSAC algorithm is achieved by iteratively selecting a random subset of the original data. These data are hypothetical inliers and this hypothesis is then tested as follows:

1. A model is fitted to the hypothetical inliers, i.e. all parameters of the model are reconstructed from the data set.
2. All other points are then tested against the fitted model and, if a point fits well to the estimated model, also considered as a hypothetical inlier.
3. The estimated model is reasonably good if a sufficient number of points have been classified as hypothetical inliers.
4. The model is reestimated from all hypothetical inliers, because the method has only been estimated from the initial set of hypothetical inliers.
5. Finally, the model is evaluated by estimating the error of the inliers relative to the model.

This procedure can be repeated a fixed number of times, each time producing either a model which is rejected because too few points are classified as inliers or a refined model together with a corresponding error measure. In the latter case, the refined model is kept if its error is lower than the last saved model.

Returning to FIG. 11, each high confidence plane is checked for a group of points that can be fit to a plane using a RANSAC algorithm 1145. If one or more of the high confidence slices contains a group of points forming a plane 1150, then the highest metric is assigned to the intersection of the fitted plane within the high confidence slice with the lowest elevation which can be fit to a plane and the axis of the cylindrical filter 1155. Alternatively, the point chosen can be random within the plane, can be within a certain error, can be the point or points with the smallest error, or can be chosen in some other manner. If none of the high confidence slices fit a plane, then the low confidence slices are checked for a group of points forming a plane using a RANSAC algorithm 1160. If one or more of the low confidence slices contains a group of points forming a plane 1165, then the highest metric is assigned to the intersection of the fitted plane within the low confidence slice with the lowest elevation which can be fit to a plane and the axis of the cylindrical filter 1170. If neither the high confidence nor low confidence slices contain a group of points forming a plane, then the highest metric is assigned to the intersection of the plane with the best fit within any slice and the axis of the cylindrical filter 1175.

Figure 14:
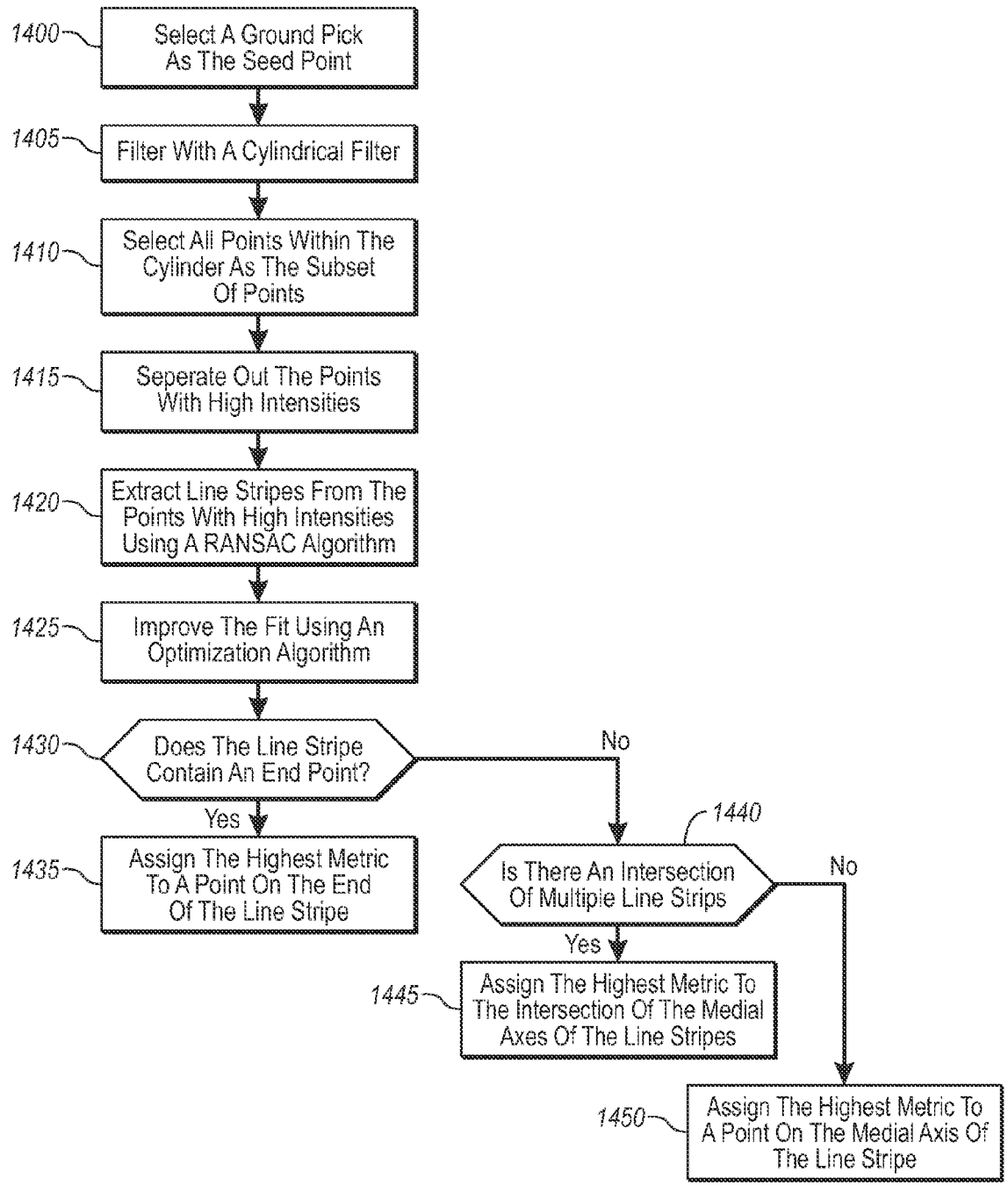
FIG. 14 is a flow diagram illustrating a method for performing a line stripe pick.
Figure 15A:
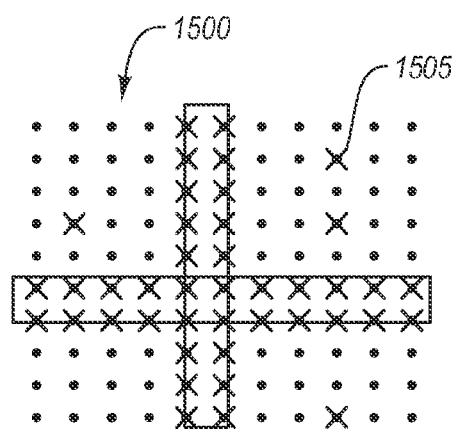
FIG. 15 illustrates an example of a line stripe pick.
Figure 15B:
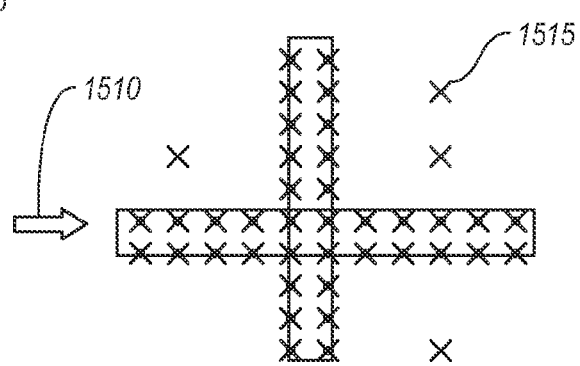
Figure 15D:
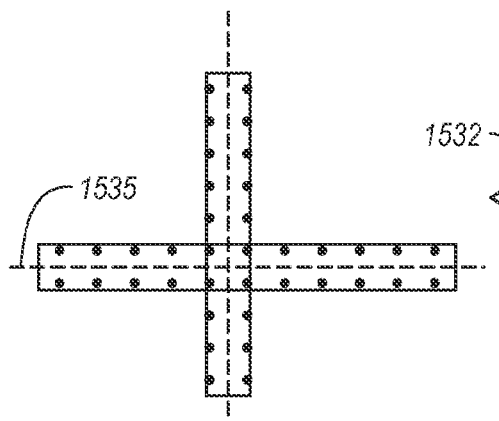
Figure 15C:
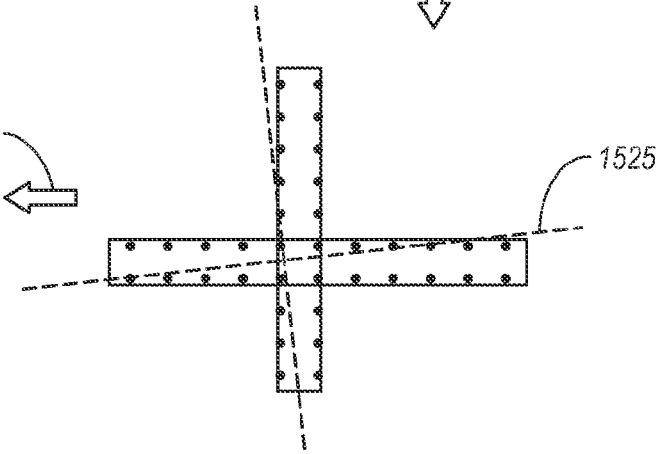

FIG. 14 illustrates an example of a method for performing a line stripe pick. A line stripe can be traffic lines, such as parking lot lines, or can be any other painted or otherwise marked stripe. An example of a line stripe pick identifies a point which: (i) is on the endpoint of the line stripe if the subset of points contains a line stripe with an endpoint; (ii) is on the medial axis of the line stripe if the subset of points contains a line stripe with no endpoint; or (iii) is the intersection of the medial axes of the line stripes if the subset of points contains an intersection of multiple line stripes. The line stripe pick can also identify the width and/or length of any or all of the identified line stripes. To help identify line stripes it can be assumed that the points on line stripes have higher intensity than surrounding points because of the painting or making material, that points on line stripes have similar intensities to one another, and the points on line stripes are clustered to form the line stripes.

In the example method of FIG. 14 a ground pick is selected as the seed point 1400. Because the ground pick can be a secondary pick, the line stripe pick can be a tertiary pick. The dataset is filtered with a cylindrical filter 1405. The cylindrical filter can be bound or can extend through the entire dataset. The points within the cylinder are selected as the subset of points 1410. The points are further filtered to separate out the points with high intensities from the points with low intensities 1415. Whether a particular intensity value is high or low depends on the dataset and can be changed according to intensity values present within the dataset, according to user input, or according to some other method.

Line stripes are extracted from the points with high intensities using a RANSAC algorithm 1420. The fit can be improved using an optimization algorithm 1425 such as Hooke-Jeeves or any other algorithm which will improve the fit to more closely resemble the medial axes. Once the medial axis or axes have been located the proper point can be identified. If the line stripe contains an endpoint 1430 the highest metric is assigned to a point on the endpoint of the line stripe 1435. If there is an intersection of multiple line stripes 1440 the highest metric is assigned to the intersection of the medial axes 1445. If there is a single line stripe with no endpoint 1440 the highest metric is assigned to a point on the medial axis of the line stripe 1450.

FIG. 15 illustrates an example of a line stripe pick. FIG. 15a illustrates an example of a dataset 1500 containing an intersection of multiple line stripes. The points with high intensities are marked with an "x" 1505. These points are then separated from the other points 1510 to form a new subset shown in FIG. 15b. This is a rough segmentation and can contain noise points 1515 outside the desired line stripes. The segmented data points can be X fitted to stripes 1520 using a RANSAC algorithm. As shown in FIG. 15c, the fitted lines may not lie on the axes of the line stripes 1525. An optimization algorithm 1530 can be used to improve the fit to the medial axes 1535 as in FIG. 15d.

Figure 16:
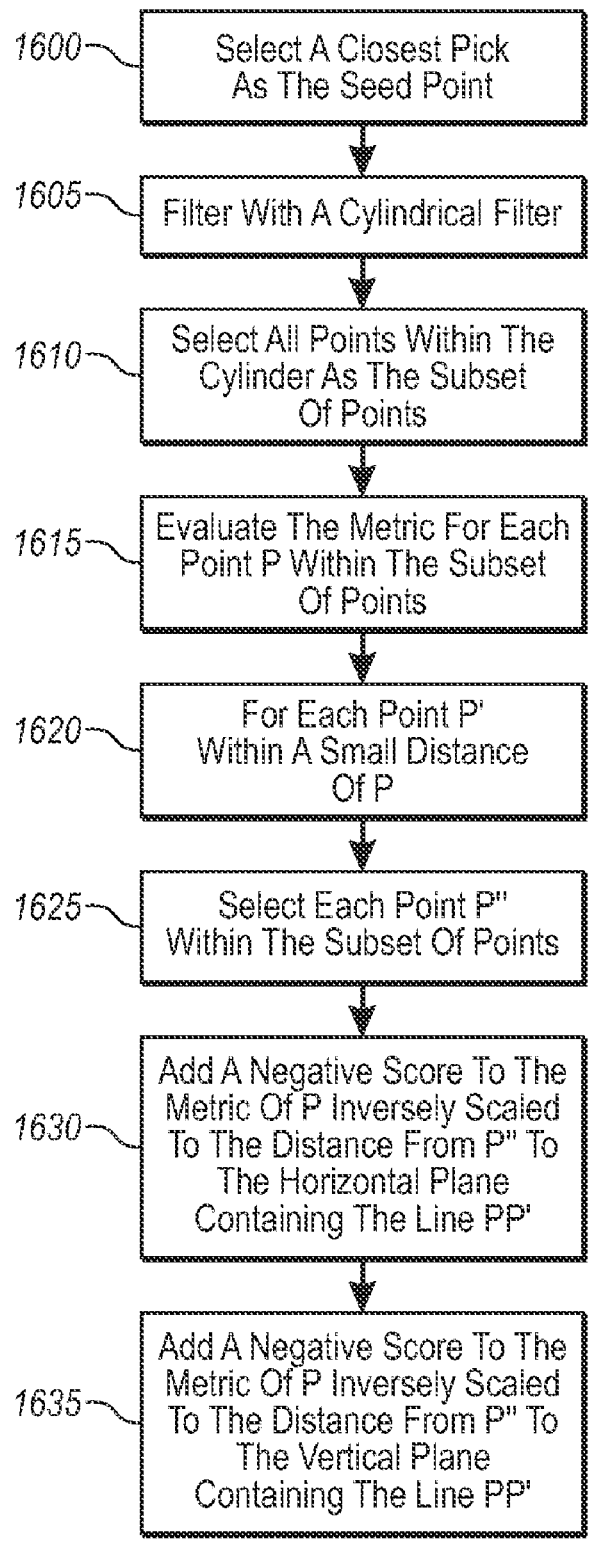
FIG. 16 is a flow diagram illustrating a method for performing a plane edge pick.

FIG. 16 illustrates an example of a method for performing a plane edge pick, which identifies a point on the edge of a plane. Edge points of planes can mark significant features in engineering applications e.g. edge of pavements, corners of rooms, etc. There can be two types of such edges—ones where a surface "bends" from near-vertical orientation (normal perpendicular to z-axis) to a near-horizontal one, and ones where only one plane is present. A closest pick is selected as a seed pick 1600, thus a plane edge pick can be a secondary pick. The dataset is then filtered using a cylindrical filter 1605 and the points within the cylinder are selected as the subset of points 1610. The cylinder can be bound to include only a portion of the dataset, or can extend through the entire dataset.

A metric is evaluated for each point P within the subset 1615. Each point P' within a small distance of P is selected 1620. What constitutes a small distance can depend on the application, the dataset, how close to one another the points are located in the subset of points, or can be based on some other criterion. Each point P'' within the subset of points is selected 1625 and a negative score is added to metric of P, inversely scaled to the distance from P'' to the horizontal plane containing the line PP' 1630 and to the distance from P''' to the vertical plane containing the line PP' 1635. Inverse scaling means that as the magnitude of the distance gets larger, the magnitude of the score gets smaller. A method for calculating this distance is to find a normal vector v of the plane and a vector w from the point to anywhere on the plane. The minimum distance is the value of w projected onto v. This can be calculated by taking the absolute value of the dot product of the two vectors v·w and dividing by the magnitude of v.

Figure 17A:
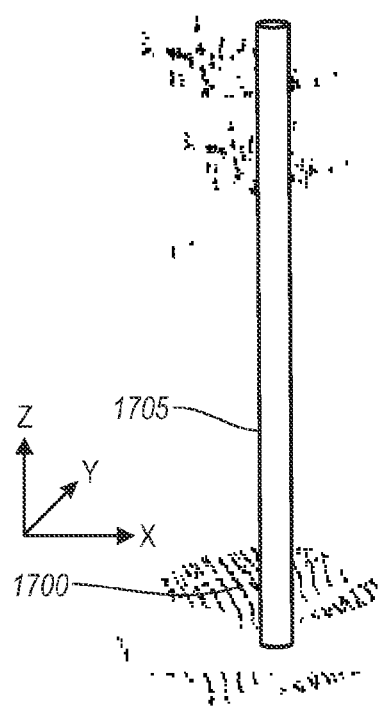
FIG. 17a illustrates an example of a plane edge pick.
Figure 17B:
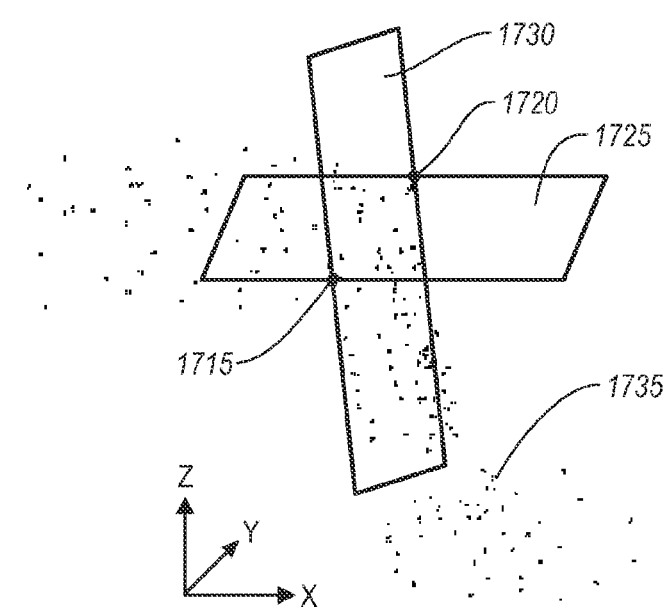
FIG. 17b illustrates an example of how a metric is calculated in a plane edge pick.

An example of a plane edge pick is illustrated in FIG. 17a which shows a dataset in which a ground pick 1700 serves as the seed point and a cylindrical filter 1705 is used to select a subset of points. FIG. 17b illustrates an example where a point P 1715 and a point within a small distance P' 1720 have been selected and horizontal 1725 and vertical 1730 planes containing the edge PP' have been constructed. Once the planes have been constructed the distance from each point in the subset of points 1735 to each plane can be calculated and turned into a score to be added to the metric of the point P 1715.

Figure 18:
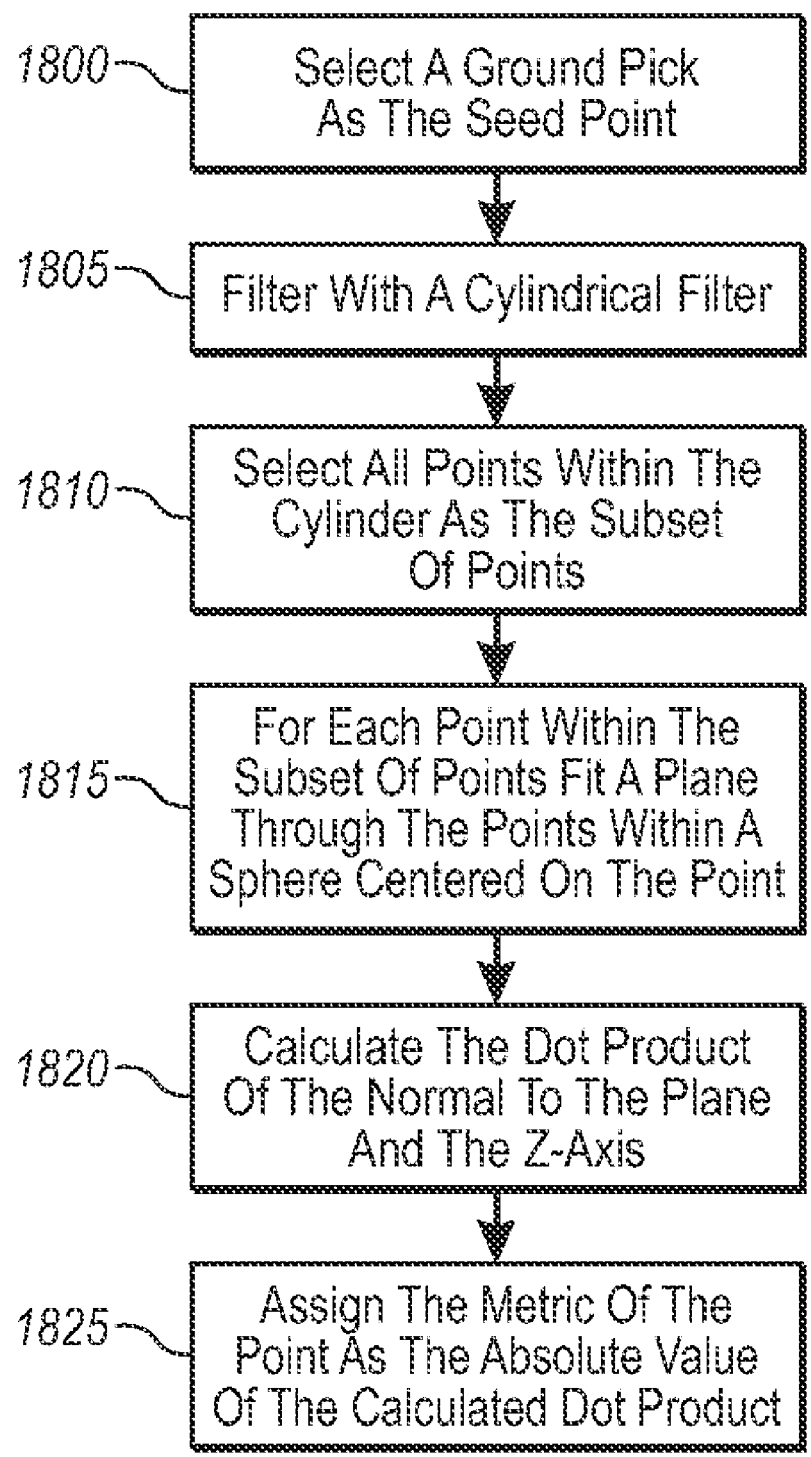
FIG. 18 is a flow diagram illustrating a method for performing a trough or ridge detection pick.

FIG. 18 illustrates an example of a method for performing a trough detection pick or ridge detection pick. A trough detection pick identifies a point in the region that is lowest and flattest in an immediate area. A ridge detection pick identifies a point in the region that is highest and flattest in an immediate area. A ground pick is selected as the seed point 1800, which means that the trough or ridge detection pick can be a tertiary pick because the ground pick can be a secondary pick. The dataset is filtered with a cylindrical filter 1805. The cylindrical filter can be bound or can extend through the entire dataset. The points within the cylindrical filter are selected as the subset of points 1810. For each point in the subset of points a plane is fit through the points within a sphere centered on the point 1815. The radius of the sphere can be determined by using a predetermined radius, selecting a certain number of points to be included in the sphere and adjusting the radius to include the appropriate number of points, or can be determined in some other way. The dot product of the normal to the fitted plane and the z-axis is calculated 1820 and the absolute value of the dot product is assigned to the point as the metric of the point 1825. Because the absolute value of the dot product of two parallel or anti-parallel vectors is one (if the two vectors are unit vectors), the highest metric will be assigned to the point with a normal vector to the fitted plane parallel or anti-parallel to the z-axis. I.e. to the point with the fitted plane which is most nearly horizontal.

Figure 19:
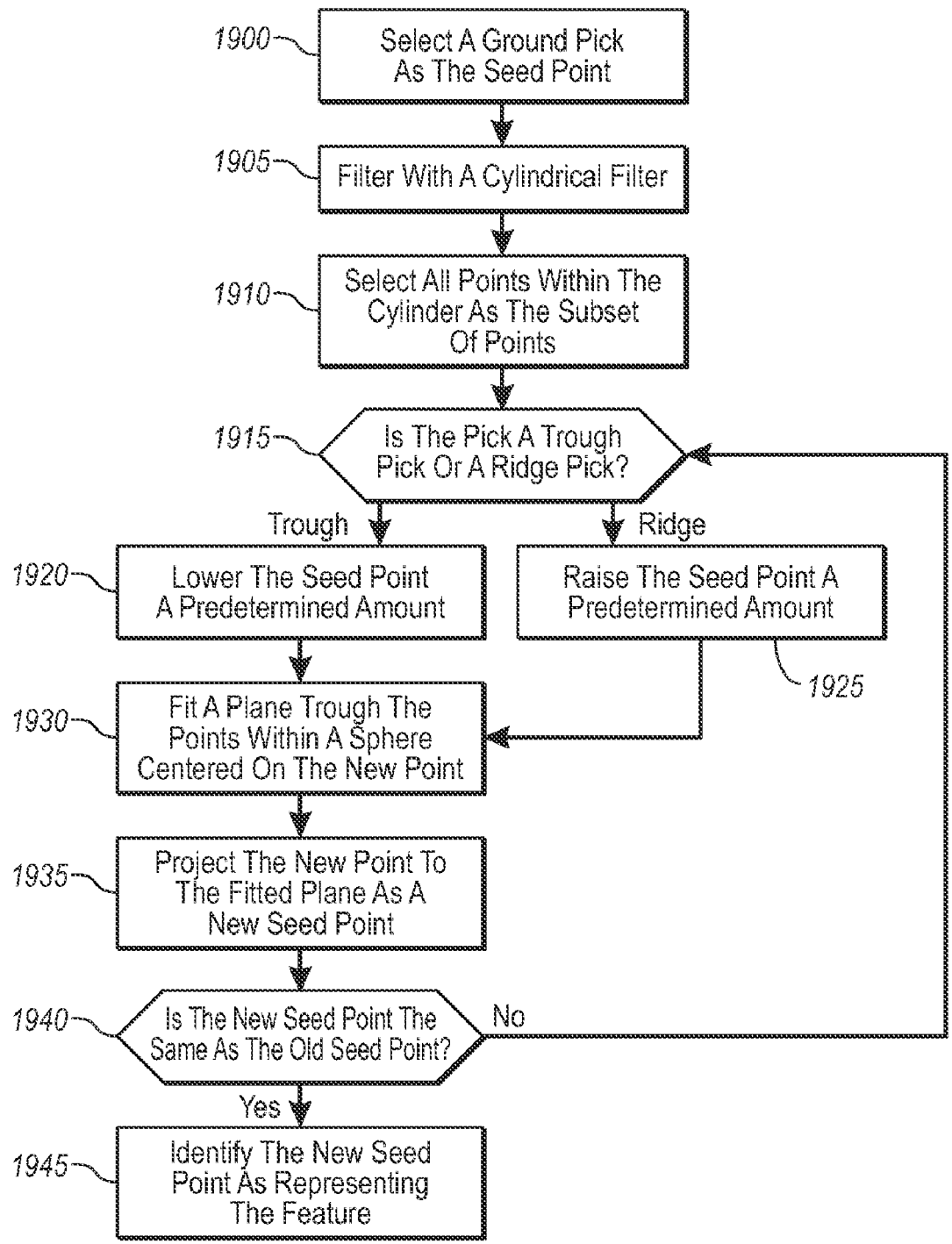
FIG. 19 is a flow diagram illustrating an alternative method for performing a trough or ridge detection pick.

FIG. 19 illustrates an alternative method for performing a trough or ridge detection pick. A ground pick is selected as the seed point 1900, which means that the trough or ridge detection pick can be a tertiary pick. The dataset is filtered with a cylindrical filter 1905. The cylindrical filter can be bound or can extend through the entire dataset. The points within the cylindrical filter are selected as the subset of points 1910. The next step depends on whether the pick is a trough pick or a ridge pick 1915. If the pick is a trough pick then the point is lowered a predetermined amount 1920. If the pick is a ridge pick, the point is raised a predetermined amount 1925. The points within a sphere centered on the new point are fitted to a plane 1930 and the point is projected to the plane as a new seed point 1935. The projection of a point onto a plane is the point at which the normal to the plane passing through the point intersects the plane. I.e., the projected point is the point on the plane that is closest to the point that is being projected. If the new seed point is the same as the old seed point 1940, but not necessarily the original seed point, then the point is identified as representing the trough or ridge 1945 otherwise the steps are repeated.

Figure 20:
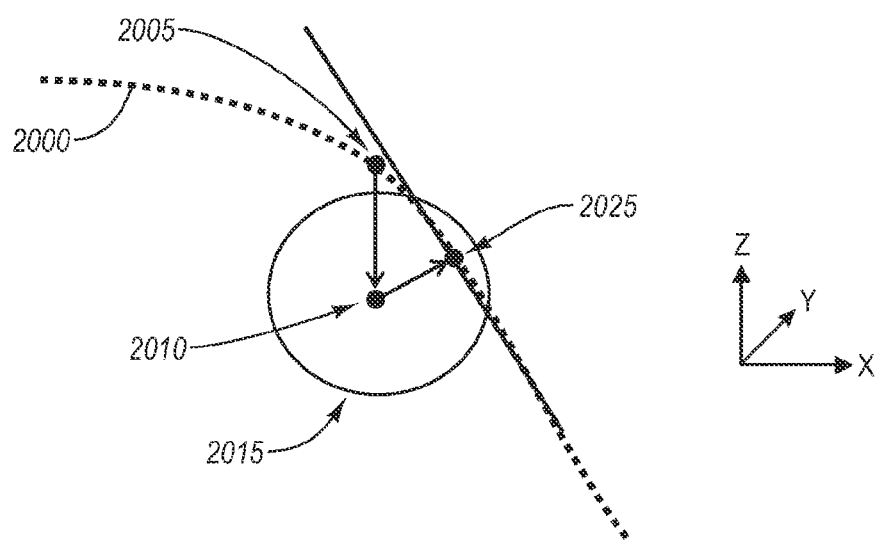
FIG. 20 illustrates an example of a trough detection pick.

FIG. 20 illustrates an example of the method of FIG. 19 for a trough detection pick. A seed point 2005 lying on a trough 2000 is lowered a predetermined amount to obtain a lowered point 2010. The points in a sphere 2015 centered on the lowered point 2010 are fitted to a plane 2020 and the lowered point 2010 is projected to the plane 2020 as a new seed point 2025. This process can be repeated until the point converges.

Figure 21:
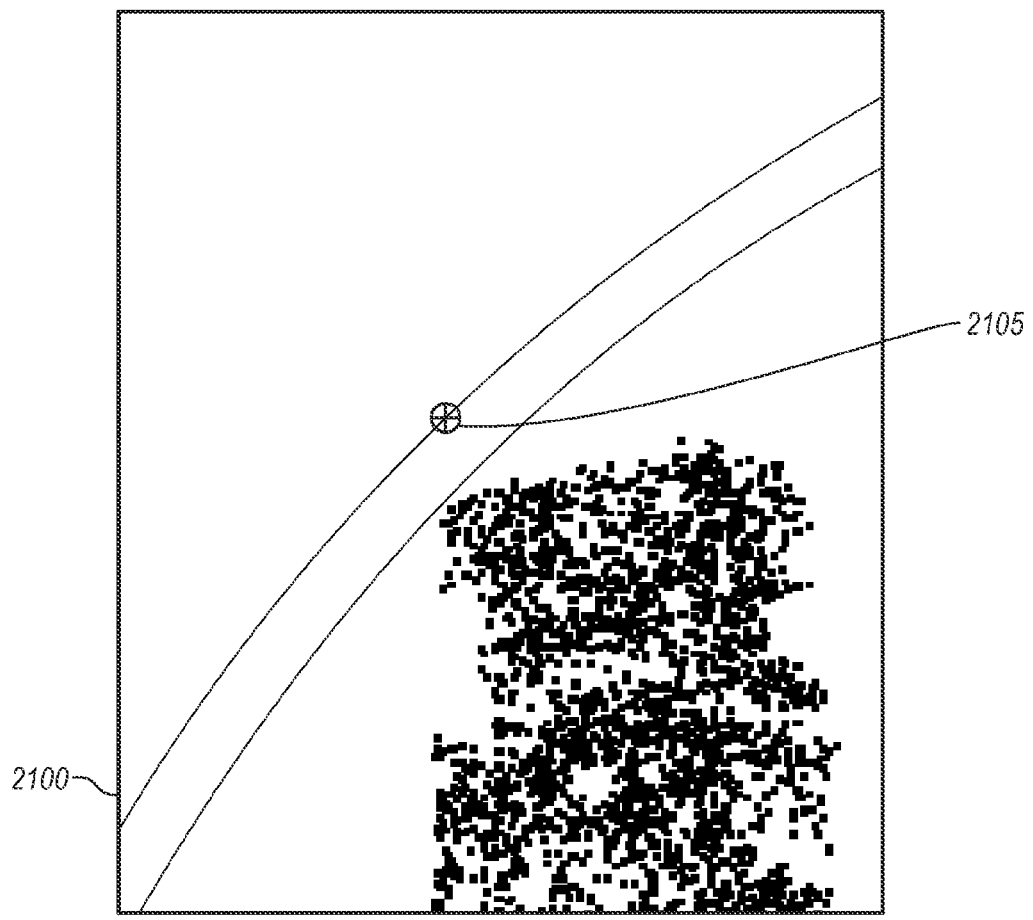
FIG. 21 illustrates a 3D dataset where a point has been identified as a possible curb edge pick.

In an example, once a pick has been completed the picked point is displayed to a user for verification of the pick. FIG. 21 illustrates a 3D dataset 2100 where a point 2105 has been identified as a possible curb edge pick. However, it can be difficult or impossible to identify whether the point 2105 is truly at the curb edge. At far zoom levels the appropriate context for the picked point 2105 can be difficult to discern. However, at closer zoom levels it can be difficult or impossible to view the point 2105 with enough context to properly identify whether the point truly is at the curb edge. A custom view that intelligently balances the view angle and the view distance can show the picked point 2105 with enough context to allow a meaningful verification of the picked point.

Figure 22:
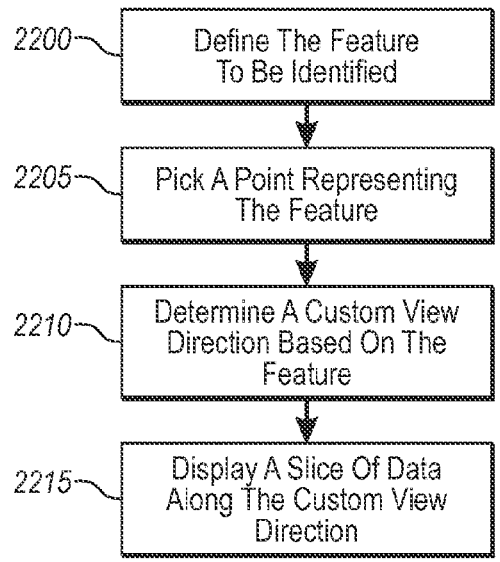
FIG. 22 is a flow diagram illustrating a method for displaying a custom view that shows the picked point with surrounding context.

FIG. 22 shows an example of a method for displaying such a view. The feature to be identified is defined 2200. Such a feature can be provided by a user by selecting from a number of possible features, can be produced automatically through feature recognition software or identified in some other method. Once the feature has been identified, a pick is performed and a point identified which possibly represents the feature 2205. Based on the feature being picked, a custom view determination can be made 2210. In some embodiments, the view can be based on attributes of the feature as well as attributes of the feature type. Such attributes can include the curvature of the feature, size of the feature, the orientation of the feature, the shape of the feature, surface planes on the features, length of the feature, direction of propagation of the feature or any other attribute which would affect the view. Such attributes can be determined automatically, based on feature templates, or can be known or input by the user. The point can then be displayed to the user along the custom view direction along with a slice of data 2215 including neighboring points to provide the proper context. The thickness of the slice and the dimensions of the neighborhood displayed should also depend on the feature type.

Figure 23:
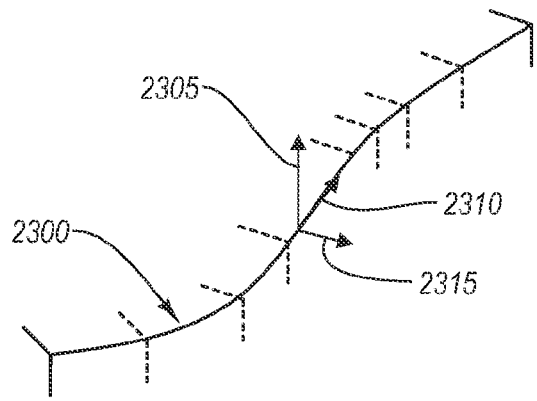
FIG. 23 illustrates a possible custom view direction for the curb edge pick of FIG. 21.

FIG. 23 illustrates an example of an intelligent view of a curb 2300 with the view direction shown into the page 2310, along the edge of the curb 2300. The slice is thin along the view direction 2300, thus showing the silhouette of the edge. In some embodiments, the view direction for a curb pick can be based on the, curvature, size and/or shape of the curb. For example, if the curb is curved, the viewpoint can be selected based on the curvature to better show, or hide, the curvature based on the preference of the user. Additionally, if the curb is long, the custom viewpoint can be selected to show only a small portion of the curb in order to avoid showing too many points thereby obscuring the view.

Figure 24:
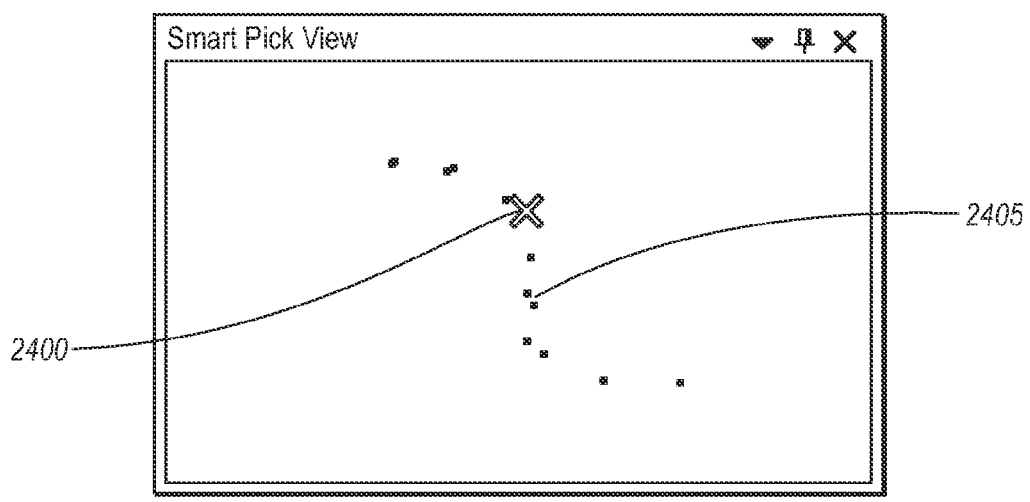
FIG. 24 illustrates the side view of a curb with the view direction along the edge of the curb.
Figure 25:
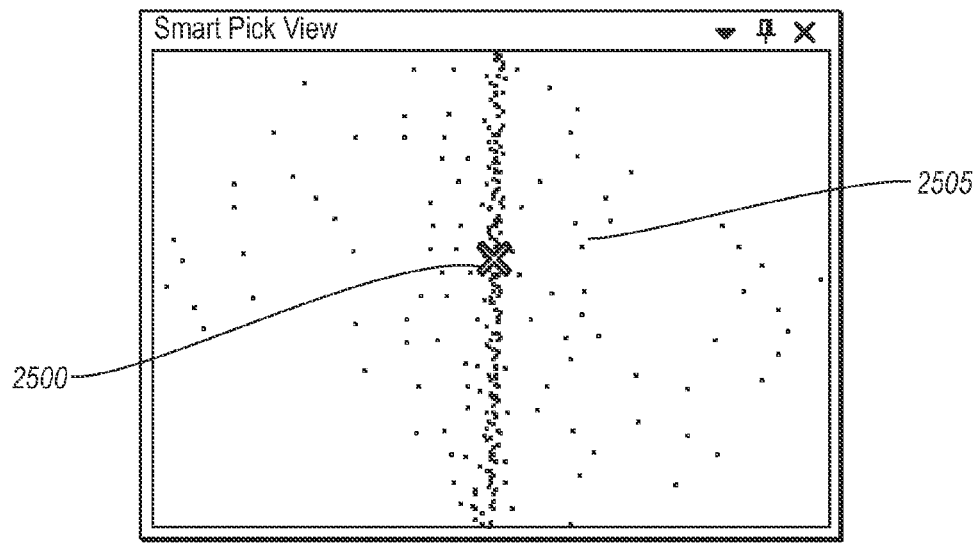
FIG. 25 illustrates an alternative view of the curb edge pick.

FIG. 24 illustrates an example of a custom view direction for the curb edge pick 2400 of FIG. 21 as shown to a user. The identified point 2400 is shown along with neighboring points 2405 to allow verification or further use of the point. FIG. 25 illustrates an alternative view of the curb edge point in FIG. 23 in which the picked point 2500 and neighboring points 2505 are shown from above. Alternative views can be defined depending on the pick and the purpose for which a user is picking the point.

Figure 26:
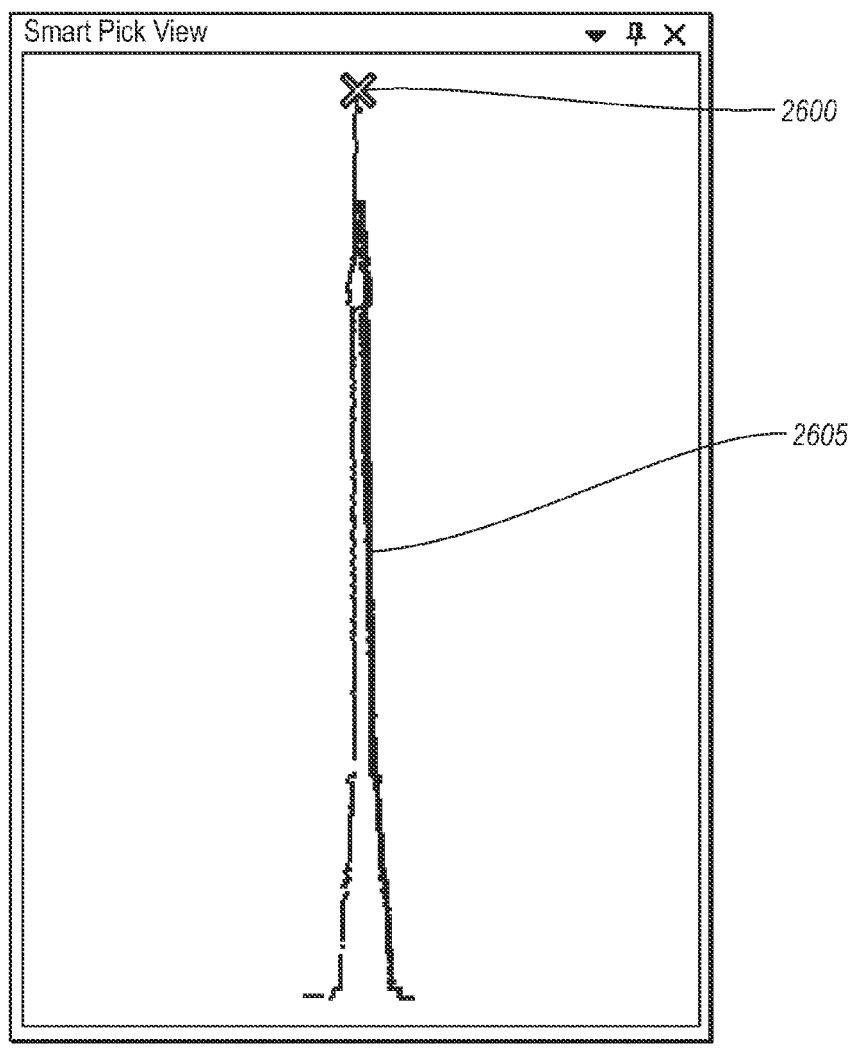
FIG. 26 illustrates an example of a custom view of a highest pick.

Different features can be shown using different views. FIG. 26 illustrates a view in which a highest pick 2600 is displayed along with a vertical cylinder 2605 of points to show that the point is the highest in the region.

The display view need not be, but can be, the original view direction. In an example, the display can show a view chosen by a user, or can show multiple custom views of the same point allowing the user multiple perspectives. In another example, if multiple views are available a list can be presented to the user, allowing the user to choose any or all of the available views.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for identifying a point representing a feature in a 3D dataset comprising:
   performing a pick, wherein the pick includes:
   filtering the dataset including extracting a subset of points based on certain criteria, wherein the criteria include a seed point; and
   evaluating a metric for each point in the subset of points, wherein the metric is a non-normalized probability that the point being evaluated represents the feature; and identifying a point or points with the highest metric as representing the feature, wherein:
   the pick is a closest pick;
   the closest pick identifies a non-occluded point rendered at a given screen coordinate; and
   the closest pick includes:
   selecting a point provided by a user as the seed point;
   filtering with a filter that is conical in shape and selecting all points within the cone as the subset of points; and
   evaluating the metric for each point in the subset of points as the negative of the distance between the point being evaluated and a camera point.

2. A method according to claim 1, wherein the 3D dataset includes a point cloud.

3. A method according to claim 1, wherein the step of filtering includes at least one of the set consisting of: filtering based on spatial position; filtering based on color; filtering based on intensity; and filtering based on a normal angle.

4. A method according to claim 1, wherein filtering the dataset further includes using a filter that is conical in shape, wherein the conical filter includes:
   an apex of the cone that is at a camera point;
   an axis of the cone including a line through the apex and through the seed point; and
   selecting all points within the cone as the subset of points.

5. A method according to claim 1, wherein filtering the dataset further includes using a filter that is cylindrical in shape, wherein the cylindrical filter includes:
   an axis of the cylinder including a line through the seed point and substantially parallel to the z-axis; and
   selecting all points within the cylinder as the subset of points.

6. A method according to claim 1, wherein the pick is a highest pick, wherein the highest pick identifies a point that is vertically highest in the vicinity of a user's pick location.

7. A method according to claim 6, wherein the highest pick includes:
  selecting a closest pick as the seed point;
  filtering with a filter that is cylindrical in shape and selecting all points within the cylinder as the subset of points; and
  evaluating the metric for each point in the subset of points as the z-coordinate of the point being evaluated.

8. A non-transitory computer-readable medium comprising computer-executable instructions for performing the steps of claim 1.

9. A method for identifying a point representing a feature in a 3D dataset comprising:
  performing a pick, wherein the pick includes:
    filtering the dataset including extracting a subset of points based on certain criteria, wherein the criteria include a seed point; and
    evaluating a metric for each point in the subset of points, wherein the metric is a non-normalized probability that the point being evaluated represents the feature; and identifying a point or points with the highest metric as representing the feature, wherein the pick is a closest pick, wherein the closest pick identifies a non-occluded point rendered at a given screen coordinate, wherein the closest pick includes:
    selecting a point provided by a user as the seed point;
    filtering with a filter that is cylindrical in shape and selecting all points within the cylinder as the subset of points; and
    evaluating the metric for each point in the subset of points as the negative of the distance between the point being evaluated and a camera point.

10. A non-transitory computer-readable medium comprising computer-executable instructions for performing the steps of claim 9.

11. A method for identifying a point representing a feature in a 3D dataset comprising:
  performing a pick, wherein the pick includes:
    filtering the dataset including extracting a subset of points based on certain criteria, wherein the criteria include a seed point; and
    evaluating a metric for each point in the subset of points, wherein the metric is a non-normalized probability that the point being evaluated represents the feature; and identifying a point or points with the highest metric as representing the feature, wherein the pick is a lowest pick, wherein the lowest pick identifies a point that is vertically lowest in the vicinity of a user's pick location, wherein the lowest pick includes:
    selecting a closest pick as the seed point;
    filtering with a filter that is cylindrical in shape and selecting all points within the cylinder as the subset of points; and
    evaluating the metric for each point in the subset of points as the negative of the z- coordinate of the point being evaluated.

12. A non-transitory computer-readable medium comprising computer-executable instructions for performing the steps of claim 11.

13. A method for identifying a point representing a feature in a 3D dataset comprising:
  performing a pick, wherein the pick includes:
    filtering the dataset including extracting a subset of points based on certain criteria, wherein the criteria include a seed point; and
    evaluating a metric for each point in the subset of points, wherein the metric is a non-normalized probability that the point being evaluated represents the feature; and identifying a point or points with the highest metric as representing the feature, wherein:
    the pick is a lowest planar surface pick;
    the lowest planar surface pick identifies a point on the lowest elevation plane;
    the lowest planar surface pick is a ground pick; and
    evaluating the metric for each point in the subset of points includes:
      dividing the subset of points into one or more horizontal slices, wherein the horizontal slices include points within the subset of points that have z-coordinates within a predetermined range;
      projecting all points within each horizontal slice onto a bitmap;
      counting the number of bits containing one or more points as a footprint size of each horizontal slice;
      comparing the footprint size of each horizontal slice to the footprint size of neighboring slices; and
      assigning high confidence to the lowest horizontal slice and to any horizontal slice which has a footprint size significantly different than neighboring slices and low confidence to all other slices.

14. A method according to claim 13, wherein the lowest planar surface pick includes:
  selecting a closest pick as the seed point; and
  filtering with a filter that is cylindrical in shape and selecting all points within the cylinder as the subset of points.

15. A method according to claim 13, wherein evaluating the metric for each point in the subset of points further includes:
  checking each high confidence slice for a group of points forming a plane using a RANSAC algorithm;
  assigning the highest metric to the intersection of the fitted plane within the high confidence slice with the lowest elevation which can be fit to a plane and an axis of the cylindrical filter;
  checking each low confidence slice for a group of points forming a plane using a RANSAC algorithm when no high confidence slice fits a plane;
  assigning the highest metric to the intersection of the fitted plane within the low confidence slice with the lowest elevation which can be fit to a plane and an axis of the cylindrical filter when no high confidence slice fits a plane; and
  assigning the highest metric to the intersection of the best fitting plane within any slice and an axis of the cylindrical filter when neither the high confidence nor low confidence slices fit to a plane.

16. A method according to claim 13, wherein the horizontal slices are adjacent to and share boundaries with neighboring slices.

17. A method according to claim 13, wherein the horizontal slices overlap neighboring slices.

18. A method according to claim 13, wherein the horizontal slices are not adjacent to and do not overlap neighboring slices.

19. A non-transitory computer-readable medium comprising computer-executable instructions for performing the steps of claim 13.

20. A method for identifying a point representing a feature in a 3D dataset comprising:
  performing a pick, wherein the pick includes:
    filtering the dataset including extracting a subset of points based on certain criteria, wherein the criteria include a seed point; and evaluating a metric for each point in the subset of points, wherein the metric is a non-normalized probability that the point being evaluated represents the feature; and identifying a point or points with the highest metric as representing the feature, wherein the pick is a line stripe pick, wherein the line stripe pick identifies a point which:
- is on the endpoint of the line stripe if the subset of points contains a line stripe with an endpoint;
- is on the medial axis of the line stripe if the subset of points contains a line stripe with no endpoint; or
- is the intersection of the medial axes of the line stripes when the subset of points contains an intersection of multiple line stripes.

21. A method according to claim 20, wherein the line stripe pick includes:
   selecting a ground pick as the seed point; and
   filtering with a filter that is cylindrical in shape and selecting all points within the cylinder as the subset of points.

22. A method according to claim 21, wherein evaluating the metric for each point in the subset of points includes:
   separating the subset of points into a group of points having high intensities and a group of points having low intensities;
   extracting line stripes from the points having high intensities using a RANSAC algorithm;
   improving the fit of the lines using an optimization algorithm; and
   assigning the highest metric to the point which:
      is on the endpoint of the line stripe if the subset of points contains a line stripe with an endpoint;
      is on the medial axis of the line stripe if the subset of points contains a line stripe with no endpoint; or
      is the intersection of the medial axes of the line stripes when the subset of points contains an intersection of multiple line stripes.

23. A method according to claim 22, wherein the optimization algorithm includes a Hooke-Jeeves algorithm.

24. A non-transitory computer-readable medium comprising computer-executable instructions for performing the steps of claim 20.

25. A method for identifying a point representing a feature in a 3D dataset comprising:
   performing a pick, wherein the pick includes:
      filtering the dataset including extracting a subset of points based on certain criteria, wherein the criteria include a seed point; and
      evaluating a metric for each point in the subset of points, wherein the metric is a non-normalized probability that the point being evaluated represents the feature; and identifying a point or points with the highest metric as representing the feature, wherein:
         the pick is a plane edge pick, wherein the plane edge pick identifies a point on the edge of a plane;
         the plane edge pick includes:
            selecting a closest pick as the seed point; and
            filtering with a filter that is cylindrical in shape and selecting all points within the cylinder as the subset of points; and
         evaluating the metric for each point P in the subset of points includes:
            performing for each point P' within a small distance of P:
               selecting each point P" within the subset of points;
               adding a first negative score to the metric of the point P, wherein the first negative score is inversely scaled by the distance from the point P" to the horizontal plane containing the line PP'; and
               adding a second negative score to the metric of the point P, wherein the second negative score is inversely scaled by the distance from the point P" to the vertical plane containing the line PP'.

26. A non-transitory computer-readable medium comprising computer-executable instructions for performing the steps of claim 25.

27. A method for identifying a point representing a feature in a 3D dataset comprising:
   performing a pick, wherein the pick includes:
      filtering the dataset including extracting a subset of points based on certain criteria, wherein the criteria include a seed point; and
      evaluating a metric for each point in the subset of points, wherein the metric is a non-normalized probability that the point being evaluated represents the feature; and identifying a point or points with the highest metric as representing the feature, wherein the pick is a trough detection pick, wherein the trough detection pick identifies a lowest and flattest point in an immediate area, wherein the trough detection pick includes:
         selecting a ground pick as the seed point;
         filtering with a filter that is cylindrical in shape and selecting all points within the cylinder as the subset of points; and
         evaluating the metric for each point in the subset of points as the absolute value of the dot-product of the normal of a plane and the z-axis, wherein the plane is found by fitting a plane through the points within a sphere centered on the point being evaluated.

28. A non-transitory computer-readable medium comprising computer-executable instructions for performing the steps of claim 27.

29. A method for identifying a point representing a feature in a 3D dataset comprising:
   performing a pick, wherein the pick includes:
      filtering the dataset including extracting a subset of points based on certain criteria, wherein the criteria include a seed point; and evaluating a metric for each point in the subset of points, wherein the metric is a non-normalized probability that the point being evaluated represents the feature; and identifying a point or points with the highest metric as representing the feature, wherein the pick is a trough detection pick, wherein the trough detection pick identifies a lowest and flattest point in an immediate area, wherein the trough detection pick further comprises:
         selecting a ground pick as the seed point;
         filtering with a filter that is cylindrical in shape and selecting all points within the cylinder as the subset of points; and
         performing the steps of:
            a first step including starting at the seed point and lowering the point;
            a second step including fitting a plane through the points within a sphere centered on the lowered point;
            a third step including projecting the lowered point to the plane as a new seed point; and
            repeating the first, second and third steps until the new seed point is the same point as the previous seed point.

30. A non-transitory computer-readable medium comprising computer-executable instructions for performing the steps of claim 29.

31. A method for identifying a point representing a feature in a 3D dataset comprising:
performing a pick, wherein the pick includes:
filtering the dataset including extracting a subset of points based on certain criteria, wherein the criteria include a seed point; and
evaluating a metric for each point in the subset of points, wherein the metric is a non-normalized probability that the point being evaluated represents the feature; and identifying a point or points with the highest metric as representing the feature, wherein the pick is a ridge detection pick, wherein the ridge detection pick identifies a highest and flattest point in an immediate area, wherein the ridge detection pick includes:
selecting a ground pick as the seed point;
filtering with a filter that is cylindrical in shape and selecting all points within the cylinder as the subset of points; and
evaluating the metric for each point in the subset of points as the absolute value of the dot-product of the normal of a plane and the z-axis, wherein the plane is found by fitting a plane through the points within a sphere centered on the point being evaluated.

32. A non-transitory computer-readable medium comprising computer-executable instructions for performing the steps of claim 31.

33. A method for identifying a point representing a feature in a 3D dataset comprising:
performing a pick, wherein the pick includes:
filtering the dataset including extracting a subset of points based on certain criteria, wherein the criteria include a seed point; and
evaluating a metric for each point in the subset of points, wherein the metric is a non-normalized probability that the point being evaluated represents the feature; and identifying a point or points with the highest metric as representing the feature, wherein the pick is a ridge detection pick, wherein the ridge detection pick identifies a highest and flattest point in an immediate area, wherein the ridge detection pick further includes:
selecting a ground pick as the seed point;
filtering with a filter that is cylindrical in shape and selecting all points within the cylinder as the subset of points; and
performing the steps of:
a first step including starting at the seed point and raising the point;
a second step including fitting a plane through the points within a sphere centered on the raised point;
a third step including projecting the raised point to the plane as a new seed point; and
repeating the first, second and third steps until the new seed point is the same point as the previous seed point.

34. A non-transitory computer-readable medium comprising computer-executable instructions for performing the steps of claim 33.

* * * * *